(12) United States Patent
Kim et al.

(10) Patent No.: US 9,898,155 B2
(45) Date of Patent: Feb. 20, 2018

(54) MULTIPLE WINDOW PROVIDING APPARATUS AND METHOD

(71) Applicant: Samsung Electronics Co. Ltd., Suwon-si, Gyeonggi-do (KR)

(72) Inventors: Chul-joo Kim, Suwon-si (KR); Kang-tae Kim, Yongin-si (KR); Eun-young Kim, Yongin-si (KR); Kwang-won Sun, Suwon-si (KR); Jae-yeol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 499 days.

(21) Appl. No.: 13/892,000

(22) Filed: May 10, 2013

(65) Prior Publication Data
US 2013/0305184 A1 Nov. 14, 2013

Related U.S. Application Data

(60) Provisional application No. 61/645,928, filed on May 11, 2012.

(30) Foreign Application Priority Data

Aug. 28, 2012 (KR) .................. 10-2012-0094411
Aug. 28, 2012 (KR) .................. 10-2012-0094524

(51) Int. Cl.
*G06F 3/048* (2013.01)
*G06F 3/0481* (2013.01)
(Continued)

(52) U.S. Cl.
CPC .......... *G06F 3/0481* (2013.01); *G06F 3/0482* (2013.01); *G06F 3/04886* (2013.01); *G06F 9/4443* (2013.01); *G06F 2203/04803* (2013.01)

(58) Field of Classification Search
CPC .... G06F 3/0481; G06F 3/04886; G06F 3/041; G06F 2203/04803; G06F 3/04883;
(Continued)

(56) References Cited

U.S. PATENT DOCUMENTS 6,686,852 B1 2/2004 Guo
8,051,000 B2 * 11/2011 Kurczek ................ G06Q 40/04
705/37
(Continued)

FOREIGN PATENT DOCUMENTS

CN 1344989 A 4/2002
CN 1458576 A 11/2003
(Continued)

*Primary Examiner* — Di Xiao
(74) *Attorney, Agent, or Firm* — Jefferson IP Law, LLP

(57) ABSTRACT

A multiple window apparatus and method is provided. A method of displaying a plurality of display windows on a screen by using a device, the method includes displaying a first display window on the screen, receiving a user input that selects an object included in the first display window. displaying a list of applications matching a display mode of the first display window in response to the user input, and displaying a second display window including an execution result of an application selected from the list in the display mode.

15 Claims, 29 Drawing Sheets

(51) Int. Cl.
  *G06F 3/0482* (2013.01)
  *G06F 3/0488* (2013.01)
  *G06F 9/44* (2018.01)
(58) Field of Classification Search
  CPC ....... G06F 2203/04808; G06F 3/04817; G06F 3/04842; G06F 3/02; G06F 3/0233; G06F 3/0236; G06F 3/0486; G06F 3/0488; G06F 3/048
  See application file for complete search history.

(56) References Cited

U.S. PATENT DOCUMENTS

| | | | |
|---|---|---|---|
| 8,549,429 | B2 | 10/2013 | Tsuruta et al. |
| 8,661,361 | B2 * | 2/2014 | Morris ................. G06F 3/0481 715/767 |
| 2002/0054141 | A1 | 5/2002 | Yen et al. |
| 2003/0076362 | A1 | 4/2003 | Terada |
| 2004/0056903 | A1 | 3/2004 | Sakai |
| 2005/0235220 | A1 | 10/2005 | Duperrouzel et al. |
| 2007/0192726 | A1 | 8/2007 | Kim et al. |
| 2008/0172609 | A1 | 7/2008 | Rytivaara |
| 2008/0214239 | A1 | 9/2008 | Hashimoto et al. |
| 2008/0282205 | A1 | 11/2008 | Dykstra-Erickson et al. |
| 2008/0320396 | A1 | 12/2008 | Mizrachi et al. |
| 2009/0013282 | A1 | 1/2009 | Mercer |
| 2009/0307631 | A1 | 12/2009 | Kim et al. |
| 2009/0322690 | A1 | 12/2009 | Hiltunen et al. |
| 2010/0062811 | A1 | 3/2010 | Park et al. |
| 2010/0081475 | A1 | 4/2010 | Chiang et al. |
| 2010/0081476 | A1 | 4/2010 | Markiewicz et al. |
| 2010/0088634 | A1 | 4/2010 | Tsuruta et al. |
| 2010/0214278 | A1 | 8/2010 | Miura |
| 2010/0248788 | A1 | 9/2010 | Yook et al. |
| 2010/0313154 | A1 * | 12/2010 | Choi ..................... G06F 3/0219 715/765 |
| 2011/0080359 | A1 * | 4/2011 | Jang ....................... G06F 1/1643 345/173 |
| 2011/0175930 | A1 * | 7/2011 | Hwang ................ G06F 3/0481 345/629 |
| 2011/0176930 | A1 | 7/2011 | Ahmad et al. |
| 2012/0011467 | A1 * | 1/2012 | Sung ................... G06F 3/0481 715/788 |
| 2012/0176322 | A1 | 7/2012 | Karmi et al. |
| 2012/0233564 | A1 * | 9/2012 | Tsuchiya ................ A63F 13/69 715/772 |
| 2012/0303476 | A1 | 11/2012 | Krzyzanowski et al. |
| 2013/0120295 | A1 | 5/2013 | Kim et al. |

FOREIGN PATENT DOCUMENTS

| | | |
|---|---|---|
| CN | 101352057 A | 1/2009 |
| CN | 101606124 A | 12/2009 |
| JP | 10-260784 A | 9/1998 |
| JP | 2004-046796 A | 2/2004 |
| JP | 2006-073015 A | 3/2006 |
| JP | 2006-115213 A | 4/2006 |
| JP | 2008-117181 A | 5/2008 |
| JP | 2008-134348 A | 6/2008 |
| KR | 10-0478920 B1 | 3/2005 |
| KR | 10-0650257 B1 | 11/2006 |
| KR | 10-0652626 B1 | 12/2006 |
| KR | 10-0700171 B1 | 3/2007 |
| KR | 10-2009-0016044 A | 2/2009 |
| KR | 10-2010-0053823 A | 5/2010 |
| KR | 10-2013-0054073 A | 5/2013 |
| WO | 2008/090902 A1 | 7/2008 |
| WO | 2009/017175 A1 | 2/2009 |
| WO | 2009/028892 A2 | 3/2009 |

* cited by examiner

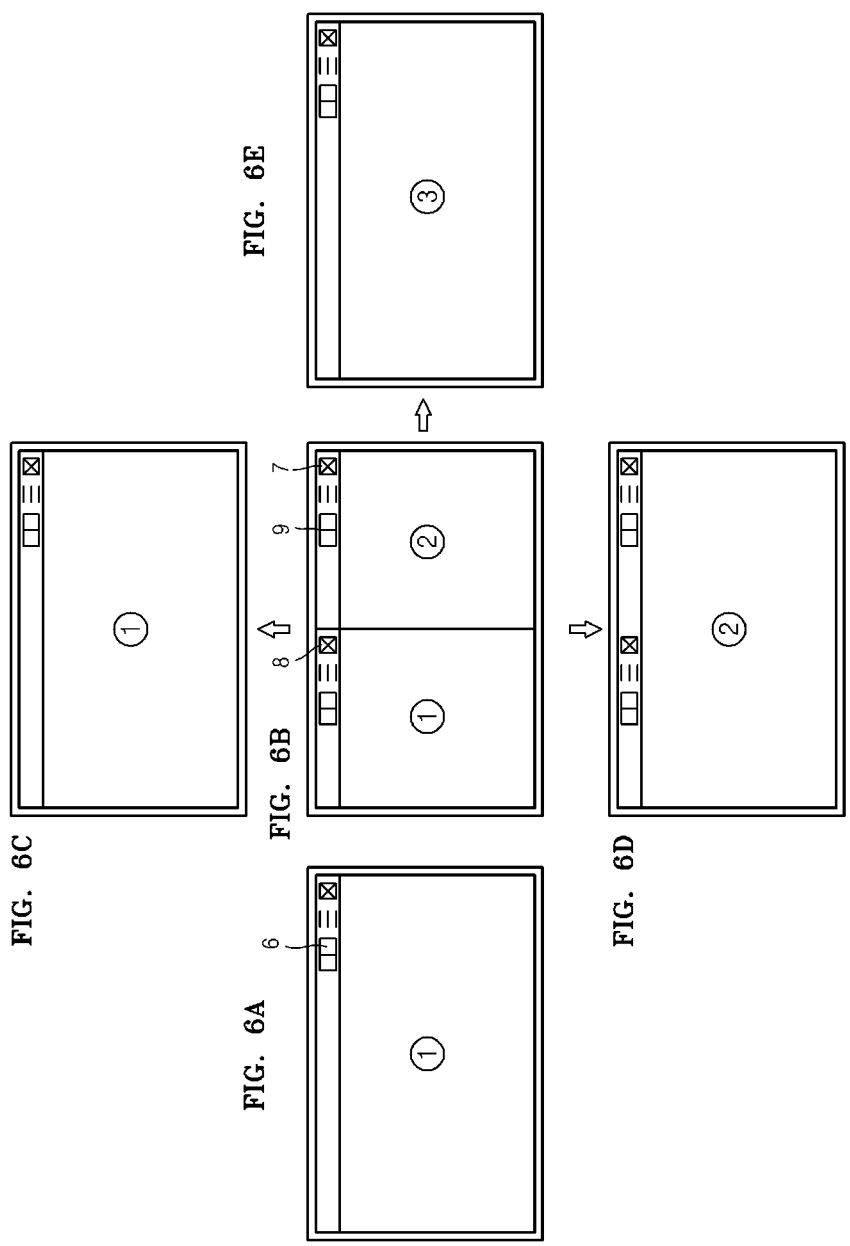

MULTIPLE WINDOW PROVIDING APPARATUS AND METHOD

CROSS-REFERENCE TO RELATED APPLICATIONS

This application claims the benefit under 35 U.S.C. § 119(e) of a U.S. Provisional application filed on May 11, 2012 in the United States Patent and Trademark Office and assigned Ser. No. 61/645,928, and under 35 U.S.C. § 119(a) of a Korean patent application filed on Aug. 28, 2012 in the Korean Intellectual Property Office and assigned Serial No. 10-2012-0094524, and a Korean patent application filed on Aug. 28, 2012 in the Korean Intellectual Property Office and assigned Serial No. 10-2012-0094411, the entire disclosures of each of which is hereby incorporated by reference.

BACKGROUND OF THE INVENTION

1. Field of the Invention

The present invention relates to a multi window providing apparatus and method. More particularly, the present invention relates to a multi window providing apparatus and method that display a display window corresponding to a display mode.

2. Description of the Related Art

In general, a touch-screen is a device that detects the presence and location of a touch in a display area, thereby allowing a touch input on the display area. The touch-screen is generally formed by assembling a touch panel together with a display and use of such a device has continuously increased due to its convenience. According to developments of central processing units and memory embedded in devices, mobile devices having wider screens have been developed.

Accordingly, the mobile devices may display more pieces of information on the screens, and a necessity for displaying display windows of diverse modes on the screens has arisen. Thus, a technology capable of displaying display windows of diverse modes on the screens of mobile devices, executing applications through display windows, and effectively determining display modes of application execution screens is required. Furthermore, a technology capable of effectively setting and changing display modes of application execution windows displayed on the screens of mobile devices is required.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a multi window providing apparatus and method that display a display window of a newly executed application in a display mode of a display window displayed on a screen.

Another aspect of the present invention is to provide displaying of a display window of a predetermined application by using a display window displayed on a screen and determining a display mode of the display window of the predetermined application based on a display mode of the display window displayed on the screen.

Another aspect of the present invention is to provide effective setting and changing of display modes of execution windows of a plurality of applications.

In accordance with an aspect of the present invention, a method of displaying a plurality of display windows on a screen by using a device is provided. The method includes displaying a first display window on the screen, receiving a user input that selects an object included in the first display window, displaying a list of applications matching a display mode of the first display window in response to the user input, and displaying a second display window including an execution result of an application selected from the list in the display mode.

The displaying of the second display window may include splitting a region of the screen of the device on which the first display window is displayed and displaying the first display window and the second display window on the split regions.

The method may further include displaying the list of applications matching the display mode when a predetermined object included in the second display window is selected, and displaying a third display window, including the execution result of the application selected from the list on the first display window, and the second display window to overlap each other.

The displaying of the third display window may include displaying the third display window in the display mode.

The first display window may be displayed on an entire region of the screen of the device.

The third display window may be displayed on an entire region of the screen of the device.

The method may further include displaying the list of applications matching the display mode when the predetermined object included in the second display window is selected, splitting at least one of the first display window and the second display window when a predetermined application is selected from the list of applications, and displaying the third display window including an execution result of the selected application on the split regions.

The display mode may include at least one of a split mode, a free style mode, and a pin-up mode, wherein the display mode corresponding to applications installed in the device is previously set.

In accordance with another aspect of the present invention, a device is provided. The device includes an input unit configured to receive a user input that selects an object included in a first display window displayed on a screen, a list generation unit configured to generate a list of applications matching a display mode of the first display window, and a display unit configured to display the generated list of applications and to display a second display window including an execution result of an application selected from the list in the display mode.

The display unit may be configured to split a region of the screen of the device on which the first display window is displayed and display the first display window and the second display window on the split regions.

The display unit may be configured to display the list of applications matching the display mode when a predetermined object included in the second display window is selected, and to display a third display window, including the execution result of the application selected from the list on the first display window, and the second display window to overlap each other.

The display unit may be configured to display the third display window in the display mode.

The first display window may be displayed on an entire region of the screen of the device.

The third display window may be displayed on an entire region of the screen of the device.

The display unit may be is configured to display the list of applications matching the display mode when the predetermined object included in the second display window is selected, to split at least one of the first display window and the second display window when a predetermined application is selected from the list of applications, and to display the third display window including an execution result of the selected application on the split regions.

The display mode may include at least one of a split mode, a free style mode, and a pin-up mode, wherein the display mode corresponding to applications installed in the device is previously set.

In accordance with another aspect of the present invention, a non-transitory computer-readable recording medium having recorded thereon a program for executing the method of displaying a plurality of display windows on a screen by using a device is provided.

In accordance with another aspect of the present invention, a method of executing a plurality of applications is provided. The method includes receiving an input of an execution command to execute a launcher related to control of the plurality of applications, providing a user interface screen that is an execution screen of the launcher in response to the execution command, receiving an input of control commands of the plurality of applications that control the plurality of applications through the user interface screen, setting a display method of the plurality of applications based on the control commands of the plurality of applications, and displaying the plurality of applications on a touch screen based on the set display method.

In accordance with another aspect of the present invention, a device for executing a plurality of applications is provided. The device includes a touch screen configured to receive an input of an execution command to execute a launcher related to control of the plurality of applications, and to provide a user interface screen that is an execution screen of the launcher in response to the execution command, and a control unit configured to, if an input of control commands of the plurality of applications that control the plurality of applications through the user interface screen is input, control a display method of the plurality of applications to be set based on the control commands of the plurality of applications, and the plurality of applications to be displayed on a touch screen based on the set display method.

In accordance with another aspect of the present invention, a portable terminal apparatus is provided. The apparatus includes a memory in which at least one program is stored, and a processor configured to control to display execution windows of a plurality of applications by executing the at least one program, wherein the at least one program includes commands that perform: determining display modes of the plurality of applications by performing an application framework for controlling and managing a single window and an independently existing multi window framework, and displaying the execution windows of the plurality of applications on a touch screen according to the determined display modes by using the multi window framework, wherein the multi window framework is a framework that manages operations of the execution windows of the plurality of applications, and wherein the multi window framework includes a multi window manager that manages the operations of the execution windows of the plurality of applications and provides Application Program Interfaces (APIs) regarding the operations of the execution windows of the plurality of applications to the application framework.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIGS. 6A to 6E are diagrams illustrating examples in which a first display window, a second display window, and a third display window are displayed and disappear based on a user input in a split mode according to an exemplary embodiment of the present invention;

FIG. 17A shows a window display screen according to an exemplary embodiment of the present invention;

FIG. 17B is a conceptual diagram for explaining a framework according to an exemplary embodiment of the present invention;

FIG. 17C shows a screen for explaining a change in a display priority according to an exemplary embodiment of the present invention;

FIG. 17D shows a screen on which windows having changed display priorities are displayed according to an exemplary embodiment of the present invention;

FIG. 17E is a conceptual diagram of a task stack according to an exemplary embodiment of the present invention;

FIG. 17F is a conceptual diagram of a display stack according to an exemplary embodiment of the present invention;

FIG. 17G is a conceptual diagram of a display stack when a new application is executed according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, it will also be understood that when an element is referred to as being "connected to" another element, it can be directly connected to the other element, or it can be electrically connected to the other element by having intervening elements interposed therebetween. Also, when a part "includes" or "comprises" an element, unless there is a particular description contrary thereto, the part can further include other elements, not excluding the other elements. Expressions such as "at least one of," when preceding a list of elements, modify the entire list of elements and do not modify the individual elements of the list.

Figure 1:
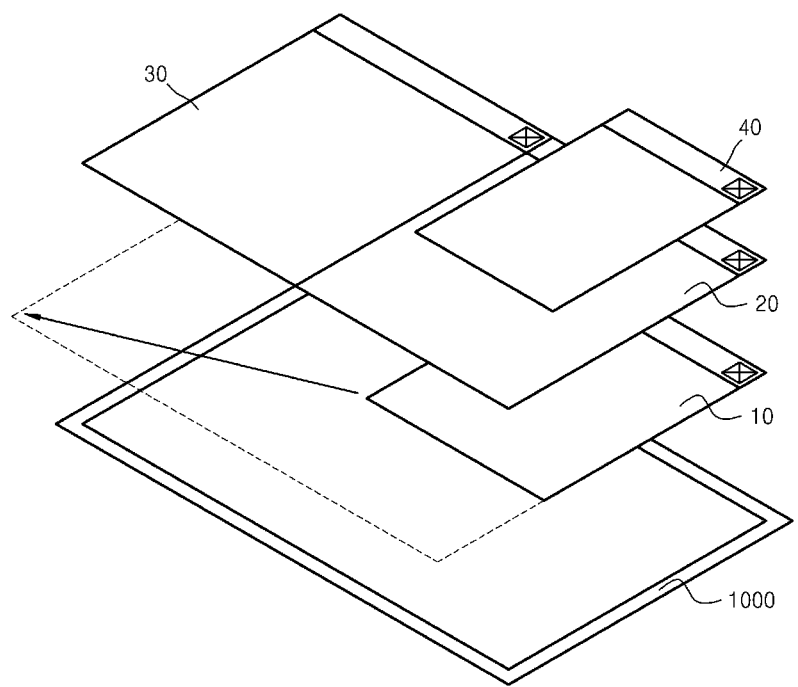
FIG. 1 is a diagram illustrating a plurality of display windows displayed on a screen of a device according to an exemplary embodiment of the present invention.

FIG. 1 is a diagram illustrating a plurality of display windows 10, 20, 30, and 40 displayed on a screen of a device 1000, according to an exemplary embodiment of the present invention.

Referring to FIG. 1, the plurality of display windows 10, 20, 30, and 40 may be displayed to overlap each other on a touch-screen in diverse display modes according to an exemplary embodiment of the present invention. Display modes may include a free style mode, a split mode, and a pin-up mode.

The free style mode display window 10 may be displayed on the entire screen of the device 1000 or a part of the screen. A window of the free style mode display window 10 may be freely adjusted by a user input.

The split mode display window 20 may be displayed on the entire screen of the device 1000. In a case where both the display windows 20 and 30 are displayed in the split mode, a region of the screen of the device 1000 may be split so that the display windows 20 and 30 may be displayed on the respective split regions. In this case, a region that is a sum of the split regions of the display windows 20 and 30 may be the entire region of the screen of the device 1000.

The pin-up mode display window 40 may be a window set so as to be displayed at the highest position of the screen of the device 1000. The pin-up mode display window 40 may be always displayed at the highest position of the screen when the pin-up mode display window 40 is displayed together with other display windows on the screen. The display window 10 may be displayed in the pin-up mode when a predetermined region (for example, a predetermined icon included in the display window 10) of the free style mode display window 10 is selected.

A separate object may be displayed together in a previously set region of the pin-up mode display window 40. For example, in the pin-up mode display window 40, a pin-shaped icon may be displayed as if it is stuck in the pin-up mode display window 40.

The display windows 10, 20, 30, and 40 may be displayed to overlap each other. At least one of the free style mode, the split mode, and the pin-up mode may match an application installed in the device 1000. Thus, if a predetermined application is executed, a display window including an execution result of the executed application may be displayed in at least one of the free style mode, the split mode, and the pin-up mode.

Layouts and operations of the display windows 10, 20, 30, and 40 displayed in their respective display modes may be defined in advance. The operations of the display windows 10, 20, 30, and 40 may include an operation with respect to a single window such as move and resize. The operations of the display windows 10, 20, 30, and 40 may also include an operation with respect to a plurality of windows such as an arrangement operation.

Figure 2:
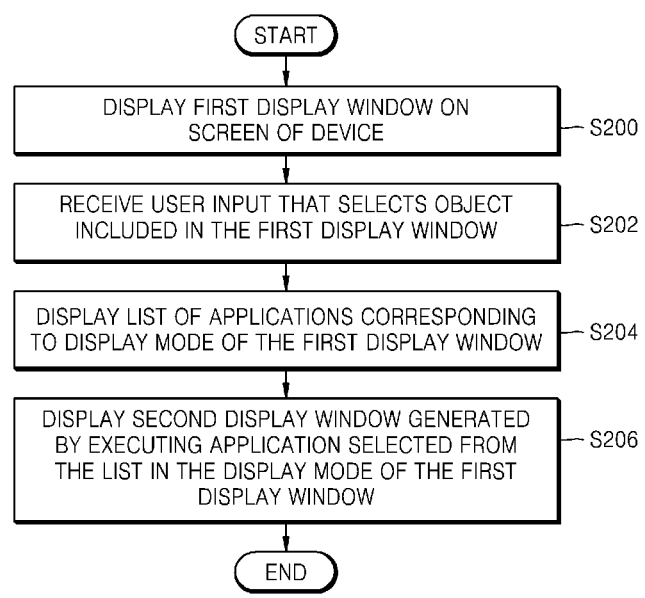
FIG. 2 is a flowchart illustrating a method in which the device of FIG. 1 displays a first display window and a second display window according to an exemplary embodiment of the present invention.

FIG. 2 is a flowchart illustrating a method in which the device 1000 displays a first display window and a second display window according to an exemplary embodiment of the present invention.

In operation S200, the device 1000 displays the first display window on a screen of the display 1000. When a predetermined application installed in the device 1000 is executed, the device 1000 may display the first display window that is an execution window of the executed application on the screen. The executed application may match at least one of a plurality of display modes in advance. The device 1000 may display the first display window in a display mode corresponding to the executed application. The display mode may include, for example, a free style mode, a split mode, and a pin-up mode, but the display mode is not limited thereto.

The application installed in the device 1000 may match at least one of the plurality of display modes according to diverse standards. The application may match a predetermined display mode based on a user input through a multi window setting window. In a case where a plurality of display windows are displayed together on the screen of the device 1000, the multi window setting window may be a window for receiving an input of a user setting value in relation to the display of the plurality of display windows. An example of the multi window setting window will be described in more detail with reference to FIG. 7 further below.

The display mode of a display window displayed according to the execution of the application may be determined according to a previously set standard based on the number of display windows already displayed on the screen of the device 1000 and display modes of the display windows, but the display mode is not limited thereto.

The device 1000 may generate the first display window including an execution result of the application differently for each display mode and display the first display window on the screen. The device 1000 may include an icon in a title bar of the first display window differently for each display mode. For example, in a case where the display mode is the split mode, the device 1000 may include an icon for displaying a list of applications of which execution windows are displayed in the same display mode as that of the first display window in the title bar of the first display window. For example, in a case where the display mode is the free style mode, the device 1000 may include an icon for changing and displaying a size of the first display window and an icon for converting the first display window from the free style mode to the pin-up mode in the title bar of the first display window. The first display window may be displayed on the entire screen of the device 1000 or on a part of the screen of the device 1000 through the icon for changing and displaying the size of the first display window. For example, in a case where the display mode is the pin-up mode, the device 1000 may include an icon for indicating the first display window to be in the pin-up mode, an icon for converting the first display window from the pin-up mode to the free style mode, and an icon for displaying the first display window in a lower end of another display window in the title bar of the first display window.

Types of icons that are to be included in the display window of each display mode may be previously set and stored in the device 1000. The device 1000 may generate and display different display windows for display modes on the screen based on the stored setting values.

Meanwhile, when the device 1000 receives a user input with respect to a title bar of a display window, the device 1000 may generate display windows so as to perform different operations according to display modes of display windows. For example, if a user touches a title bar of a free style mode display window for more than a previously set period of time, the device 1000 may provide a User Interface (UI) for adjusting a size of the display window. If the user touches a title bar of a split mode display window for more than a previously set period of time, the device 1000 may perform an operation that is different from an operation of adjusting the size of the display window.

An operation corresponding to the user input with respect to the title bar of the display window may be differently set according to each display mode and a type of the user input. A setting value may be stored in the device 1000 in advance.

Therefore, if a predetermined application is executed, the device 1000 may determine a display mode matching the application, determine a type of an icon corresponding to the determined display mode, and generate and display different display windows for each display mode of the application based on the type of the icon so as to display a display window of the application on the screen.

When the device 1000 receives a user input with respect to a title bar of a display window, the device 1000 may determine and perform an operation corresponding to a display mode of the display window and the received user input.

Display windows differently generated for each display mode will be described in more detail below with reference to FIG. 10.

In operation S202, the device 1000 receives a user input that selects an object included in the first display window. The first display window may include a title bar that may include an icon for indicating a list of applications installed in the device 1000. The title bar of the first display window may be a bar for indicating a name of the first display window and may be displayed in at least one of a plurality of sides of the first display window.

The device 1000 may receive a user input that selects the icon included in the title bar of the first display window. The user input may be a user touch input that is received through the screen of the device 1000, but the user input is not limited thereto. The user input may be an input through a key pad (not shown) included in the device 1000 and a separate input apparatus (not shown) connected to the device 1000.

In operation S204, the device 1000 displays the list of applications corresponding to the display mode of the first display window. The device 1000 may display the list of applications installed in the device 1000 when the icon displayed on the title bar of the first display window is selected. The device 1000 may determine the display mode of the first display window and display a list of applications matching the display mode of the first display window from among the applications installed in the device 1000. For example, in a case where the first display window is displayed in the split mode, when the icon for indicating the list of applications is selected, the device 1000 may display a list of applications of which display windows are displayed in the split mode. In a case where the first display window is displayed in the free style mode, when the icon for indicating the list of applications is selected, the device 1000 may display a list of applications of which display windows are displayed in the free style mode. In a case where the first display window is displayed in the pin-up mode, when the icon for indicating the list of applications is selected, the device 1000 may display a list of applications of which display windows are displayed in the pin-up mode. However, the present invention is not limited thereto, and the device 1000 may determine applications that are to be included in the list of applications according to diverse settings.

The device 1000 may include and display the list of applications in a part of the first display window. For example, the device 1000 may display the list of applications in a lower end of the title bar of the first display window. However, the present invention is not limited thereto, and the device 1000 may display the list of applications through a separate pop-up window.

In operation S206, the device 1000 may display a second display window generated by executing the application selected from the list of applications to the display mode of the first display window. The device 1000 may receive a user input that selects a predetermined application included in the list of applications. The device 1000 may also display the second display window including an execution result of the selected application to the display mode of the first display window.

For example, in a case where the first display window is displayed in the split mode, the device 1000 may display the second display window in the split mode. The device 1000 may split the first display window into two regions, display the first display window on one of the split two regions, and display the second display window on the other region. In this case, the first display window may be reduced and displayed on one of the split two regions, but the present invention is not limited thereto.

Figure 3A:
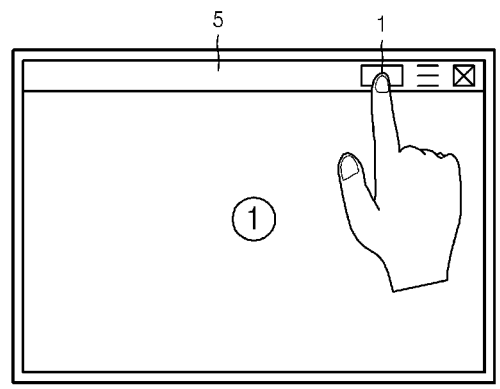
FIGS. 3A to 3C are diagrams illustrating examples in which the device of FIG. 1 displays a second display window in a split mode based on a user input with respect to a first display window displayed in the split mode according to an exemplary embodiment of the present invention.
Figure 3B:
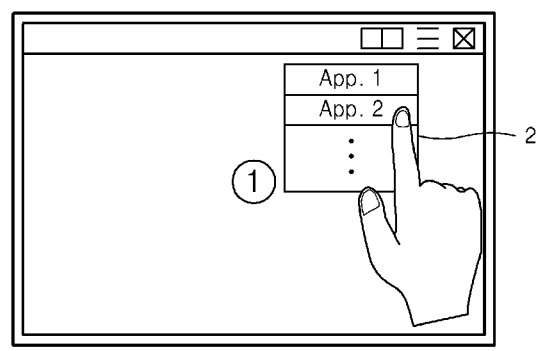
Figure 3C:
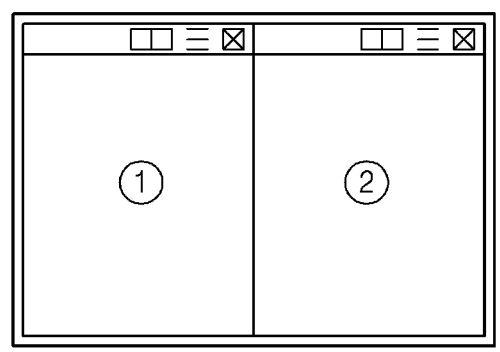

FIGS. 3A to 3C are diagrams illustrating examples in which the device 1000 displays a second display window in a split mode based on a user input with respect to a first display window displayed in the split mode according to an exemplary embodiment of the present invention.

Referring to FIG. 3A, the first display window may be displayed in the split mode on the entire region of a screen of the device 1000. An icon 1 for indicating a list of applications may be included in a title bar 5 of the first display window and may be touched by a user.

Referring to FIG. 3B, when the icon 1 is selected by a user touch input, a list 2 of applications matching a display mode of the first display window may be displayed on the first display window. The list 2 of applications indicating a result obtained by executing applications in the split mode that is the display mode of the first display window may be displayed on the first display window.

The list 2 of applications may be included in the first display window and may be displayed in a lower end of the title bar 5. The list 2 of applications may be vertically arranged, but the list 2 is not limited thereto, and may be horizontally arranged. The list 2 of applications may be displayed through a separate pop-up window. The user may touch an application of the list 2 of applications.

Referring to FIG. 3C, when the application is selected from the list 2 of applications by the user touch input, the device 1000 may display the second display window including an execution result of the selected application on the screen. The device 1000 may display the second display window in the split mode that is the display mode of the first display window. The device 1000 may split the first display window into two regions, display the first display window on one of the split regions, and display the second display window on the other region. In this case, the first display window may be reduced and displayed on one of the split regions but the first display window is not limited thereto.

Figure 4:
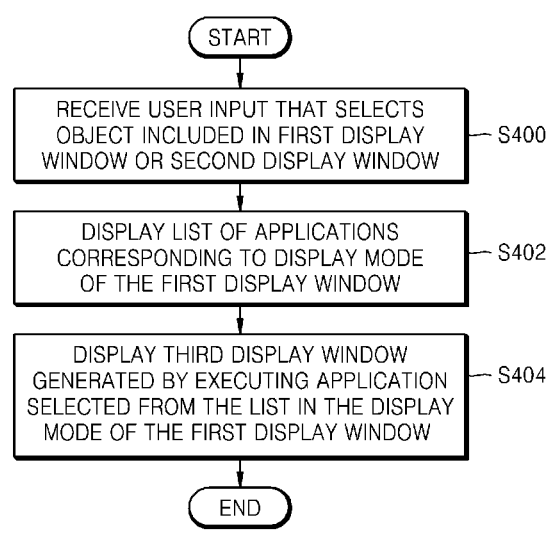
FIG. 4 is a flowchart illustrating a method in which the device of FIG. 1 displays a third display window while displaying a first display window and a second display window according to an exemplary embodiment of the present invention.

FIG. 4 is a flowchart illustrating a method in which the device 1000 displays a third display window while displaying a first display window and a second display window according to an exemplary embodiment of the present invention.

Referring to FIG. 4, in operation S400, the device 1000 receives a user input that selects an object included in the first display window or the second display window. The device 1000 may receive the user input that selects the object included in the second display window or the first display window of operation S206 described above in relation to FIG. 2.

The first display window or the second display window may include a title bar that may include an icon for indicating a list of applications installed in the device 1000. The device 1000 may receive a user input that selects the icon included in the title bar of the first display window or the second display window. The user input may be a user touch input through a screen of the device 1000 but the user input is not limited thereto. The user input may be an input through a key pad (not shown) included in the device 1000 and a separate input apparatus (not shown) connected to the device 1000.

In operation S402, the device 1000 may display a list of applications corresponding to a display mode of the first display window. When the icon included in the title bar of the first display window or the second display window is selected, the device 1000 may display a list of applications installed in the device 1000. The device 1000 may determine the display mode of the first display window or a display mode of the second display window and display a list of applications matching the display mode of the first display window or the second display window from among the applications installed in the device 1000. For example, in a case where the first display window and the second display window are displayed in a split mode, when the icon for indicating the list of applications is selected on the second display window, the device 1000 may display a list of applications of which display windows are displayed in the split mode. In a case where the first display window and the second display window are displayed in a free style mode, when the icon for indicating the list of applications is selected on the second display window, the device 1000 may display a list of applications of which display windows are displayed in the free style mode. In a case where the first display window and the second display window are displayed in a pin-up mode, when the icon for indicating the list of applications is selected on the second display window, the device 1000 may display a list of applications of which display windows are displayed in the pin-up mode.

The device 1000 may include and display the list of applications in a part of the first display window or the second display window. For example, the device 1000 may display the list of applications on a lower end of the title bar of the first display window or the second display window. However, the present invention is not limited thereto, and the device 1000 may display the list of applications through a separate pop-up window.

In operation S404, the device 1000 may display the third display window generated by executing an application selected from the list of applications in the display mode of the first display window. The device 1000 may receive a user input that selects a predetermined application included in the list of applications. The device 1000 may display the third display window including an execution result of the selected application in the display mode of the first display window or the second display window.

For example, in a case where the first display window and the second display window are displayed in the split mode, the device 1000 may display the third display window in the split mode. In this case, the device 1000 may split the second display window into two regions, display the second display window on one of the split two regions, and display the third display window on the other region. In this case, the second display window may be reduced and displayed on one of the split regions but the second display window is not limited thereto.

The device 1000 may display the third display window to overlap the first display window and the second display window. In more detail, the device 1000 may display the third display window on the entire region of the screen of the device 1000 in the split mode so that the third display window may overlap the first display window and the second display window.

FIGS. 5A to 5D are diagrams illustrating examples in which the device 1000 displays a third display window in a split mode based on a user input with respect to at least one of a first display window and a second display window displayed in the split mode according to an exemplary embodiment of the present invention.

Figure 5A:
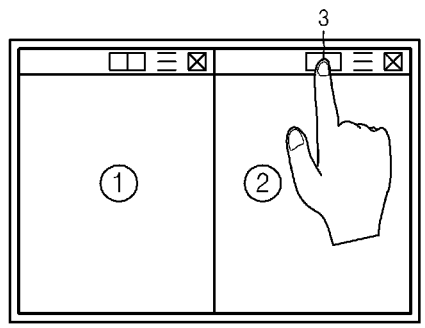
FIGS. 5A to 5D are diagrams illustrating examples in which the device of FIG. 1 displays a third display window in a split mode based on a user input with respect to at least one of a first display window and a second display window displayed in the split mode according to an exemplary embodiment of the present invention.

Referring to FIG. 5A, the entire region of a screen of the device 1000 may be split into two regions and the first display window and the second display window may be displayed on the two split regions in the split mode. An icon 3 for indicating a list of applications displayed on a title bar of the second display window may be touched by a user.

Figure 5B:
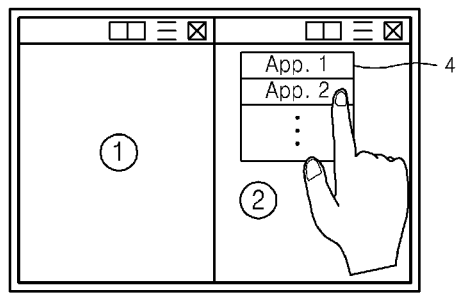

Referring to FIG. 5B, when the icon 3 is selected by a user touch input, a list 4 of applications matching the split mode may be displayed on the second display window.

The list 4 of applications may be included in the second display window or may be displayed in a lower end of the title bar of the second display window. The list 4 of applications may be vertically arranged, but the list 4 is not limited thereto, and may be horizontally arranged along the title bar. The list 4 of applications may be displayed through a separate pop-up window. The user may touch a predetermined application of the list 4 of applications.

Figure 5C:
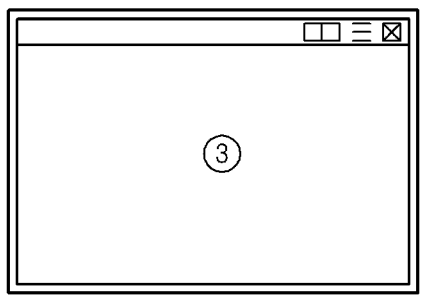
Figure 5D:
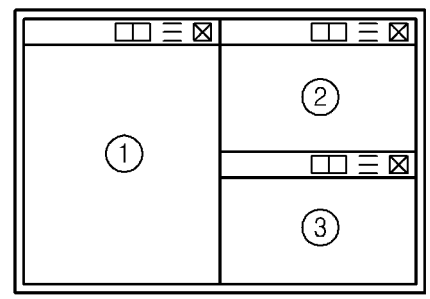

Referring to FIGS. 5C and 5D, when the predetermined application is selected from the list 4 of applications by the user touch input, the device 1000 may display the third display window including an execution result of the selected application on the screen. The device 1000 may display the second display window in the split mode that is the display mode of the first display window.

In more detail, as shown in FIG. 5C, the device 1000 may display the third display window to overlap the first display window and the second display window. More specifically, the device 1000 may display the third display window on the entire region of the screen of the device 1000 in the split mode so that the third display window may overlap the first display window and the second display window.

Referring to FIG. 5D, the device 1000 may split the second display window into two regions, display the second display window on one of the split regions, and display the third display window on the other region. In this case, the second display window may be reduced and displayed on one of the split regions but the second display window is not limited thereto.

FIGS. 6A to 6E are diagrams illustrating examples in which a first display window, a second display window, and a third display window are displayed and made to disappear based on a user input in a split mode according to an exemplary embodiment of the present invention.

Referring to FIG. 6A, the first display window may be displayed on the entire region of a screen of the device 1000 in the split mode. An icon 6 for indicating a list of applications may be included in a title bar of the first display window and may be touched by a user.

When the icon 6 is selected by a user touch input, the list of applications may be displayed, a predetermined application included in the list may be selected, and the second display window that is an execution window of the selected application may be displayed as shown in FIG. 6B. In this case, the device 100 may split the first display window into two regions, display the first display window on one of the split regions, and display the second display window on the other region.

When an icon 7 for closing the second display window of FIG. 6B is selected, as shown in FIG. 6C, the second display window may disappear from the screen of the device 1000, and the first display window may be displayed on the entire region of the screen of the device 1000.

As an icon 8 for closing the first display window of FIG. 6B is selected, as shown in FIG. 6D, the first display window may disappear from the screen of the device 1000, and the second display window may be displayed on the entire region of the screen of the device 1000.

As an icon 9 for indicating a list of applications of FIG. 6B is selected, the list of applications may be displayed and a predetermined application included in the list of applications may be selected. In this case, as shown in FIG. 6D, the third display window that is an execution window of the selected application may be displayed to overlap the first display window and the second display window.

In a case where the first display window and the second display window are displayed on the screen of the device 1000, and the third display window is displayed to overlap the first display window and the second display window, if the icon 7 of the second display window is selected based on a predetermined user input, the second display window may disappear. In this case, the first display window and the third display window may be displayed on the split two regions of the screen of the device 1000, but the first display window and the third display window are not limited thereto.

Figure 7:
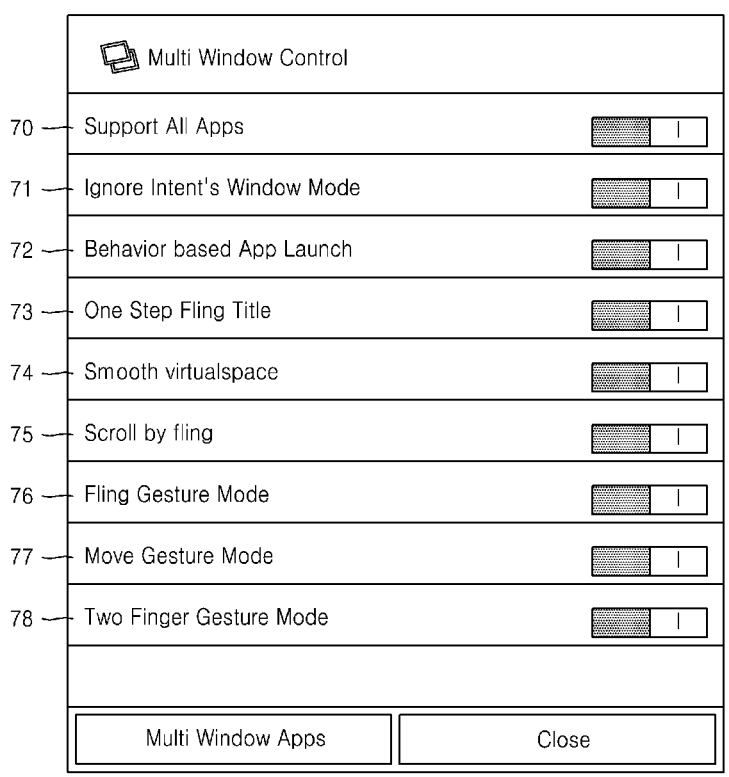
FIG. 7 is a diagram illustrating an example of a multi window setting window displayed on the device of FIG. 1 according to an exemplary embodiment of the present invention.

FIG. 7 is a diagram illustrating an example of a multi window setting window displayed on the device 1000 according to an exemplary embodiment of the present invention. In a case where a plurality of display windows are displayed together on a screen of the device 1000, the multi window setting window may be a window for receiving an input of a user setting value in relation to the display of the plurality of display windows.

Referring to FIG. 7, the multi window setting window according to an exemplary embodiment of the present invention may include a Support All Apps field 70, an Ignore Intent's Window Mode field 71, a Behavior based App Launch field 72, a One Step Fling Title field 73, a Smooth virtualspace field 74, a Scroll by fling field 75, a Fling Gesture Mode field 76, a Move Gesture Mode field 77, and a Two Finger Gesture Mode field 78. Each of the fields 70, 71, 72, 73, 74, 75, 76, 77, and 78 of the multi window setting window may include a button for activating a function corresponding to each of the fields 70, 71, 72, 73, 74, 75, 76, 77, and 78.

The Support All Apps field 70 is a field to support a multi window function for applications that are not set to support a multi window as well as applications that are set to support the multi window. If the Support All Apps field 70 is activated, the multi window function may be supported with respect to all applications installed in the device 1000, but the multi window function is not limited thereto.

The Ignore Intent's Window Mode field 71 is a field to disregard a user setting related to a multi window support. If the Ignore Intent's Window Mode field 71 is activated, the user setting related to the multi window support is disregarded, and the multi window function may or may not be supported with respect to applications installed in the device 1000.

The Behavior based App Launch field 72 is a field to display a display window of a newly executed application in a display mode of a display window that is currently activated on the screen of the device 1000.

The One Step Fling Title field 73 is a field to conveniently provide a setting of the multi window function. If the One Step Fling Title field 73 is inactivated, a bar disposed at an upper end of the screen of the device 1000 may extend and be dropped down by a user touch so that the multi window function may be set based on a user input through a predetermined menu included in the extended bar. However, if the One Step Fling Title field 73 is activated, when the bar disposed at an upper end of the screen of the device 1000 extends and is dropped down by the user touch, the multi window function may be immediately performed.

The Smooth virtualspace field 74 is a field to continuously move a page on a launcher screen of the device 1000 or a home screen. If the Smooth virtualspace field 74 is activated, a page displayed on the screen of the device 1000 may be continuously moved based on a user drag or flick input. In more detail, a first page displayed on the screen of the device 1000 may be continuously moved a predetermined distance in a direction of the user flick input with respect to the first page displayed on the screen of the device 1000 based on the user flick input. As a result of moving the first pages, a part of a second page connected to the first page and a part of the first page may be stopped and displayed together on the screen of the device 1000.

The Scroll by fling field 75 is a field to move a predetermined page displayed on a display window to a previous page or a next page based on a user input that touches a predetermined bar (for example, a title bar or an action bar of the display window) displayed on the display window and drags or flicks the bar in a left or right direction.

The Fling Gesture Mode field 76 is a field to arrange display windows or change a display mode of a display window based on a user input that touches a predetermined bar (for example, a title bar or an action bar of the display window) displayed on the display window and drags or flicks the bar.

If the Fling Gesture Mode field 76 is activated, the device 1000 may provide an exemplary function below. For example, based on a user input that touches the predetermined bar displayed on the display window and drags or flicks the bar in a left or right direction, the device 1000 may display the display window in a split mode in a left or right direction of the screen of the device 1000. Also, based on a user input that touches the predetermined bar displayed on the display window and drags or flicks the bar in an upper direction, the device 1000 may change the display mode of the display window. Also, based on a user input that touches the predetermined bar displayed on the display window and drags or flicks the bar in a lower direction, the device 1000 may reduce a size of the display window to a previously set size.

The Move Gesture Mode field 77 is a field to set a function of displaying a display window in the form of an entire screen, a minimum screen, a right split screen, and a left split screen if a ghost view is moved to an upper side, a lower side, a left edge side, or a right edge side of the screen of the device 1000. For example, if the user touches a virtual window corresponding to the display window and moves the virtual window to the upper side, the lower side, the left edge side, or the right edge side of the screen of the device 1000, the display window may be displayed in the form of the entire screen, the minimum screen, the right split screen, and the left split screen. In this case, the virtual window corresponding to the display window may be a window indicating an edge part of the display window. For example, if the user touches the display window for more than a previously set period of time, and moves the display window to the upper side, the lower side, the left edge side, or the right edge side of the screen of the device 1000, the device 1000 may display the display window in the form of the entire screen, the minimum screen, the right split screen, and the left split screen.

The Two Finger Gesture Mode field 78 is a field to arrange and display two display windows in the split mode if predetermined bars included in the two display windows are touched for more than a previously set period of time.

Figure 8:
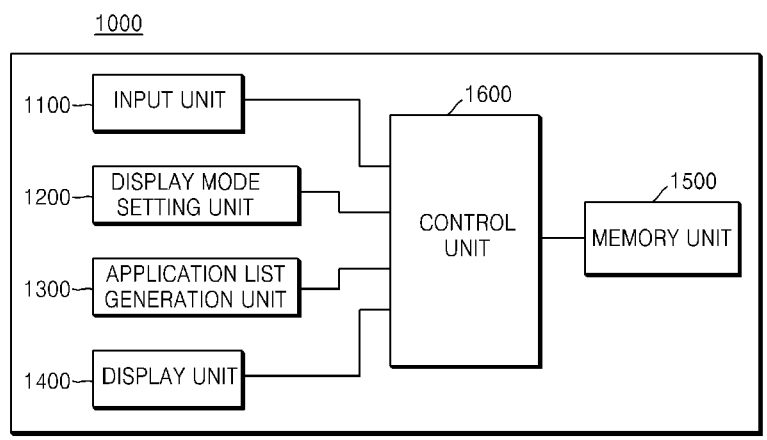
FIG. 8 is a block diagram of the device of FIG. 1 according to an exemplary embodiment of the present invention.

FIG. 8 is a block diagram of the device 1000 according to an exemplary embodiment of the present invention.

Referring to FIG. 8, the device 1000 according to an exemplary embodiment of the present invention includes an input unit 1100, a display mode setting unit 1200, an application list generation unit 1300, a display unit 1400, a memory unit 1500, and a control unit 1600.

The input unit 1100 receives a user input from the device 1000. A user may touch a predetermined location on a screen of the device 1000. The input unit 1100 may receive the user input via the user touch. The input unit 1100 may receive the user input through an input tool such as a key pad of the device 1000, a key board and a mouse connected to the device 1000, or a stylus. The input unit 1100 may determine what display window of which part is touched by the user based on a location of the screen of the device 1000 touched by the user. For example, the input unit 1100 may detect whether an icon for indicating a list of applications on a display window is touched.

The display mode setting unit 1200 sets a display mode of a display window displayed when an application is executed. The display mode may include, for example, a free style mode, a split mode, and a pin-up mode. The display mode setting unit 1200 may match an application installed in the device and at least one of a plurality of display modes according to diverse standards. The display mode setting unit 1200 may match the application and the display mode based on a user input through a multi window setting window, but the display mode setting unit 1200 is not limited thereto.

The display mode setting unit 1200 may also determine the display mode according to a previously set standard based on, for example, the number of display windows already displayed on the screen of the device 1000 and display modes of display windows.

The application list generation unit 1300 may generate a list of applications when a predetermined object included in a display window is selected. An icon for indicating the list of applications may be displayed on a title bar of the display window. The application list generation unit 1300 may also generate a list of applications matching a display mode of the display window on which the icon is displayed when the icon is selected. For example, if the icon for indicating the list of applications is selected on the display window displayed in the split mode, the application list generation unit 1300 may generate a list of applications indicating an execution result through the display window displayed in the split mode.

The display unit 1400 displays a display window of applications and the list of applications on the screen of the device 1000. When a predetermined application installed in the device 1000 is executed, the display unit 1400 may display a first display window that is an execution window of the executed application. The first display window may be displayed according to at least one of, for example, the free style mode, the split mode, and the pin-up mode.

When an icon displayed on a title bar of the first display window is selected, the display unit 1400 may display a list of applications installed in the device 1000. The display unit 1400 may display a list of applications matching a display mode of the first display window from among the applications installed in the device 1000.

The display unit 1400 may include and display the list of applications in a part of the first display window. For example, the display unit 1400 may display the list of applications on a lower end of the title bar of the first display window. However, the present invention is not limited thereto, and the display unit 1400 may display the list of applications through a separate pop-up window.

The display unit 1400 may display a second display window generated by executing an application selected from the list of applications in the display mode of the first display window. For example, in a case where the first display window is displayed in the split mode, the display unit 1400 may display the second display window in the split mode.

The display unit 1400 may also split the first display window into two regions, display the first display window on one of the split two regions, and display the second display window on the other region. In this case, the first display window may be reduced and displayed on one of the two split regions, but the first display window is not limited thereto.

When the icon displayed on the title bar of the first display window or a title bar of the second display window is selected, the display unit 1400 may display the list of applications installed in the device 1000. The display unit 1400 may display a list of applications matching the display mode of the first display window or a display mode of the second display window from among the applications installed in the device 1000.

The display unit 1400 may also include and display the list of applications in a part of the first display window or the second display window. For example, the display unit 1400 may display the list of applications on a lower end of the title bar of the first display window or the second display window. However, the present invention is not limited thereto, and the display unit 1400 may display the list of applications through a separate pop-up window.

The display unit 1400 may display a third display window generated by executing an application selected from the list of applications displayed on the first display window or the second display window. For example, in a case where the first display window and the second display window are displayed in the split mode, the display unit 1400 may display the third display window in the split mode. In this case, the display unit 1400 may also split the second display window into two regions, display the second display window on one of the split two regions, and display the third display window on the other region. In this case, the second display window may be reduced and displayed on one of the two split regions, but is not limited thereto.

The display unit 1400 may display the third display window to overlap on the first display window and the second display window. In more detail, the display unit 1400 may display the third display window on the entire region of the screen of the device 1000 in the split mode that the third display window may overlap the first display window and the second display window.

The memory unit 1500 stores various types of information so that the device 1000 displays the display window in diverse display modes, selects the icon displayed on the display window, and displays a predetermined list of applications.

The control unit 1600 may control the input unit 1100, the display mode setting unit 1200, the application list generation unit 1300, the display unit 1400, and the memory unit 1500 so that the device 1000 displays the display window in diverse display modes, selects the icon displayed on the display window, and displays the predetermined list of applications.

The input unit 1100, the display mode setting unit 1200, the application list generation unit 1300, and the display unit 1400 may partially or wholly operate by using a software module, but the present invention is not limited thereto. The input unit 1100, the display mode setting unit 1200, the application list generation unit 1300, and the display unit 1400 may partially operate by hardware.

At least a part of the input unit 1100, the display mode setting unit 1200, the application list generation unit 1300, and the display unit 1400 may be included in the control unit 1600, and the input unit 1100, the display mode setting unit 1200, the application list generation unit 1300, the display unit 1400, and the control unit 1600 may operate by using a single processor, but the present invention is not limited thereto.

Figure 9:
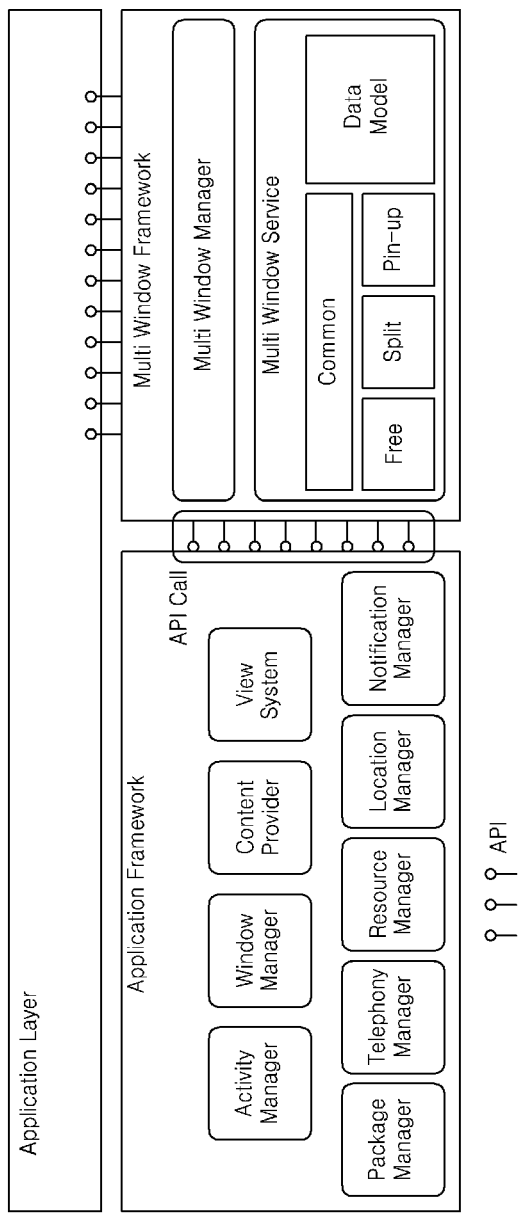
FIG. 9 is a diagram illustrating a multi window framework architecture in an Android® operating system that the device of FIG. 1 uses to display a plurality of display windows on its screen according to an exemplary embodiment of the present invention.

FIG. 9 is a diagram illustrating multiple window framework architecture in an Android® operating system that the device 1000 uses to display a plurality of display windows on its screen according to an exemplary embodiment of the present invention.

Referring to FIG. 9, the multi window framework architecture may include an application framework and a multi window framework. The application framework may be a framework for controlling and managing a single window in a case where the single framework is displayed on the device 1000. The multi window framework may be a framework for displaying and controlling a plurality of windows according to a predetermined display mode in a case where the plurality of windows is displayed on the device 1000. The multi window framework may be present separately (independently) from the application framework.

The application framework may include an activity manager, a window manager, and a view system. The multi window framework may include a multi window manager.

When an application is executed, the activity manager may call information regarding an execution window corresponding to the executed application from the multi window framework. The activity manager may receive information regarding a display mode, size, and location of the execution window of the application from the multi window framework based on a lifecycle of the execution window of the application. The activity manager may call the information regarding the display mode, size, and location of the execution window of the application in a creating operation during the lifecycle of the execution window of the application.

The window manager may check the execution window of the application corresponding to a user touch input. The window manager may provide location information on a display corresponding to the user touch input, and receive information regarding the execution window of the application corresponding to the user touch input determined by the multi window framework from the multi window framework.

The window manager may also receive the information regarding the size and location of the execution window of the application from the multi window framework in response to the user touch input and determine the execution window of the application corresponding to the user touch input based on the received size and location of the execution window of the application.

The view system may determine sizes and locations of a widget window and a pop-up window. The multi window framework may determine the sizes and locations of the widget window and the pop-up window. The view system may receive information regarding the sizes and locations of the widget window and the pop-up window from the window framework.

The multi window manager included in the multi window framework manages diverse operations regarding a multi window function provided by the device 1000 and provides diverse Application Program Interfaces (APIs) regarding the multi window function. A multi window service may store diverse APIs regarding the multi window function. An API regarding a common function of the single window and the multi window may be implemented in a common class. An API regarding a function applied to only the multi window may be differently implemented according to a display mode.

A launcher program that will be described further below with respect to FIGS. 13 and 14 may be included in an application layer and may be connected to the multi window framework. The launcher program may receive diverse APIs regarding the multi window function from the multi window framework and may set diverse matters regarding a display of execution windows of a plurality of applications.

Figure 10A:
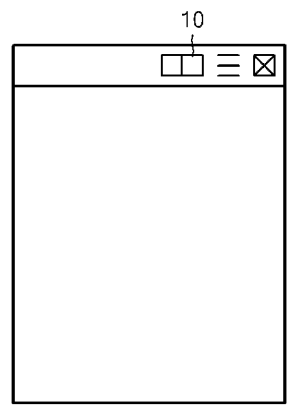
FIGS. 10A to 10C are diagrams illustrating examples of display windows generated for each display mode according to an exemplary embodiment of the present invention.
Figure 10B:
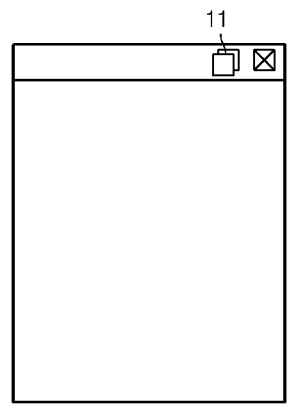
Figure 10C:
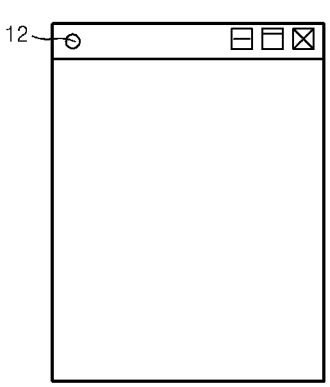

FIGS. 10A to 10C are diagrams illustrating examples of display windows generated for each display mode according to an exemplary embodiment of the present invention.

FIG. 10A shows an example of a display window in a split mode according to an exemplary embodiment of the present invention. Referring to FIG. 10A, the display window in the split mode may include an icon 10 for indicating a list of applications of which execution windows are displayed in the split mode in a title bar.

FIG. 10B shows an example of a display window in a free style mode according to an exemplary embodiment of the present invention. Referring to FIG. 10B, the display window in the free style mode may include an icon 11 for changing and displaying a size of the display window in the title bar. The icon for changing and displaying the size of the display window may be used to enlarge the display window displayed on a part of a screen of the device 1000 and display the enlarged display window on the entire screen of the device 1000 or reduce the display window displayed on the entire screen of the device 1000 and display the reduced display window in a part of the screen of the device 1000.

The display window in the free style mode may further include an icon (not shown) for changing the display window from the free style mode to a pin-up mode.

FIG. 10C shows an example of a display window in the pin-up mode according to an exemplary embodiment of the present invention. Referring to FIG. 10C, the display window in the pin-up mode may include an icon 12 for indicating a first display window in the pin-up mode. The display window in the pin-up mode may further include an icon (not shown) for converting the display window from the pin-up mode to the free style mode and an icon (not shown) for displaying the first display window on a lower end of another display window.

The icon 10 is displayed on the display window in the split mode, the icon 11 is displayed on the display window in the free style mode, and the icon 12 is displayed on the display window in the pin-up mode in FIGS. 10A through 10C, but the present invention is not limited thereto. Icons that perform functions the same as or similar to those of the icons 10, 11, and 12 may be included in the display window regarding each display mode.

As described above, the device 1000 may display and operate execution windows of a plurality of applications in diverse display modes. Display modes corresponding to a plurality of execution windows and operations of the execution windows in each display mode may be set by a launcher program that will be described later.

Figure 11:
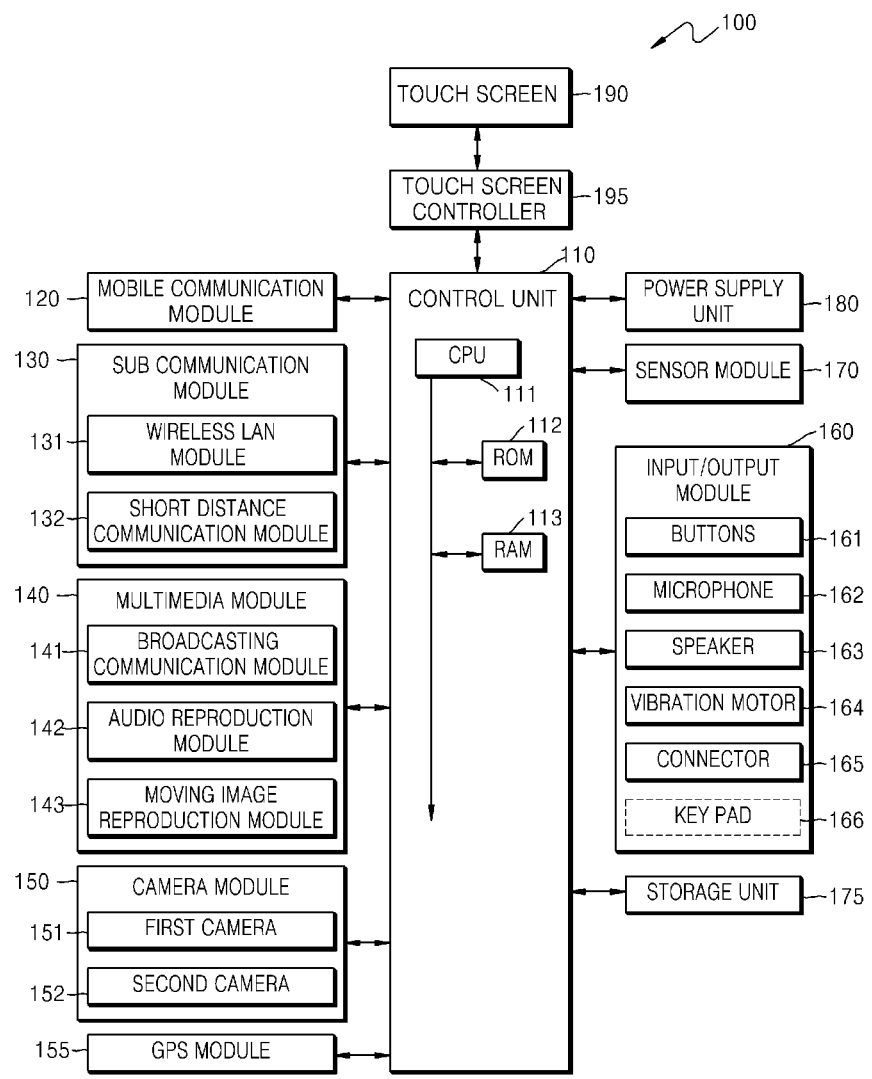
FIG. 11 is a schematic block diagram of a device according to an exemplary embodiment of the present invention.

FIG. 11 is a schematic block diagram of a device 100, according to an exemplary embodiment of the present invention.

Referring to FIG. 11, the device 100 may be connected to an external apparatus (not shown) by using a mobile communication module 120, a sub communication module 130, and a connector 165. The "external apparatus" may include another apparatus (not shown), a mobile phone (not shown), a smart phone (not shown), a tablet Personal Computer (PC) (not shown), a server (not shown), etc.

The device 100 includes a touch screen 190 and a touch screen controller 195. The device 100 includes a control unit 110, a mobile communication module 120, a sub communication module 130, a multimedia module 140, a camera module 150, a Global Positioning System (GPS) module 155, an input/output module 160, a sensor module 170, a storage unit 175, and a power supply unit 180. The sub communication module 130 includes at least one of a wireless Local Area Network (LAN) module 131 and a short distance communication module 132. The multimedia module 140 includes at least one of a broadcasting communication module 141, an audio reproduction module 142, and a moving image reproduction module 143. The camera module 150 includes at least one of a first camera 151 and a second camera 152. The input/output module 160 includes at least one of a plurality of buttons 161, a microphone 162, a speaker 163, a vibration motor 164, the connector 165, and a key pad 166.

The control unit 110 may include a Central Processing Unit (CPU) 111, a Read-Only Memory (ROM) 112 that stores a control program for controlling the device 100, and a Random-Access Memory (RAM) 113 that stores a signal or data input from the outside of the device 100 or is used as a memory region for a job performed by the device 100. The CPU 111 may include a single core, a dual core, a triple core or a quad core. The CPU 111, the ROM 112, and the RAM 113 may be connected to each other via an internal bus.

The control unit 110 may control the mobile communication module 120, the sub communication module 130, the multimedia module 140, the camera module 150, the GPS module 155, the input/output module 160, the sensor module 170, the storage unit 175, the power supply unit 180, a first touch screen 190a, a second touch screen 190b, and a touch screen controller 195.

The mobile communication module 120 allows the device 100 to be connected to the external apparatus over mobile communication by using at least one (one or a plurality of) antennas (not shown) according to the control of the control unit 110. The mobile communication module 120 transmits and receives a wireless signal for a voice call, a video call, a Short Message Service (SMS), or a Multimedia Message Service (MMS) to and from the mobile phone (not shown), the smart phone (not shown), the table PC or another apparatus (not shown) having a phone number input to the device 100.

The sub communication module 130 may include at least one of the wireless LAN module 131 and the short distance communication module 132. For example, the sub communication module 130 may include only the wireless LAN module 131, only the short distance communication module 132, or both the wireless LAN module 131, only the short distance communication module 132.

The wireless LAN module 131 may be connected to the Internet at a place in which a wireless Access Point (AP) (not shown) is installed according to the control of the control unit 110. The wireless LAN module 131 supports the Institute of Electrical and Electronics Engineers (IEEE) 802.11x wireless LAN standard of the IEEE. The short distance communication module 132 may wirelessly perform short distance communication between the device 100 and an image forming apparatus (not shown) according to the control of the control unit 110. Short distance communication may include Bluetooth, Infrared Data Association (IrDA), etc.

The device 100 may include at least one of the mobile communication module 120, the wireless LAN module 131, and the short distance communication module 132 according to its performance. For example, the device 100 may include a combination of the mobile communication module 120, the wireless LAN module 131, and the short distance communication module 132 according to its performance.

The multimedia module 140 may include the broadcasting communication module 141, the audio reproduction module 142, or the moving image reproduction module 143. The broadcasting communication module 141 may receive a broadcasting signal (for example, a TV broadcasting signal, a radio broadcasting signal, or a data broadcasting signal) and broadcasting additional information (for example, an Electronic Program Guide (EPG) or an Electronic Service Guide (ESG) sent from a broadcasting station over a broadcasting communication antenna (not shown) according to the control of the control unit 110. The audio reproduction module 142 may reproduce a digital audio file (for example, a file with a filename extension mp3, wma, ogg or way) stored or received according to the control of the control unit 110. The moving image reproduction module 143 may reproduce a digital moving image file (for example, a file with a filename extension mpeg, mpg, mp4, avi, mov, or mkv) stored or received according to the control of the control unit 110. The moving image reproduction module 143 may reproduce the digital audio file.

The multimedia module 140 may include the audio reproduction module 142 and the moving image reproduction module 143 except for the broadcasting communication module 141. The audio reproduction module 142 of the moving image reproduction module 143 of the multimedia module 140 may be included in the control unit 100.

The camera module 150 may include at least one of the first and second cameras 151 and 152 that capture a still image or a moving image according to the control of the control unit 110. The first camera 151 or the second camera 152 may include an auxiliary light source (for example, a flash (not shown)) that provides an amount of light used for photographing. The first camera 151 may be disposed in the front of the device 100. The second camera 152 may be disposed in the rear of the device 100. As another method, the first camera 151 and the second camera 152 may be disposed to be adjacent to each other (for example, an interval between the first camera 151 and the second camera 152 may be from 1 cm to 8 cm) and may capture a 3 Dimensional (3D) still image or a 3D moving image.

The GPS module 155 may receive radio waves from a plurality of GPS satellites (not shown) in an Earth orbit, and calculate a location of the device 100 by using a time of arrival of the radio waves from the GPS satellites (not shown) to the device 100.

The input and output module 160 may include at least one of the plurality of buttons 161, the microphone 162, the speaker 163, the vibration motor 164, the connector 165, and the key pad 166.

The buttons 161 may be formed in the front, side, or rear of a housing of the device 100 and may include a power and lock button (not shown), a volume button (not shown), a menu button, a home button, a back button, and a search button 161.

The microphone 162 receives voice or sound according to the control of the control unit 110 and generates an electrical signal.

The speaker 163 may output a sound corresponding to diverse signals (for example, a wireless signal, a broadcasting signal, a digital audio file, a digital moving image file, or a photographing signal, etc.) of the mobile communication module 120, the sub communication module 130, the multimedia module 140, or the camera module 150 according to the control of the control unit 110, to the outside of the device 100. The speaker 163 may output a sound (for example, a button manipulation sound corresponding to a phone call or a call connection sound) corresponding to a function performed by the device 100. A single speaker 163 or a plurality of speakers 163 may be formed at an appropriate location or locations of the housing of the device 100.

The vibration motor 164 may convert the electrical signal into a mechanical vibration according to the control of the control unit 110. For example, in a case where the device 100 in a vibration mode receives the voice call from another apparatus (not shown), the vibration motor 164 operates. A single vibration motor 164 or a plurality of vibration motors 164 may be formed in the housing of the device 100. The vibration motor 164 may operate in response to a user touch operation that touches the touch screen 190 and a continuous touch motion on the touch screen 190.

The connector 165 may be used as an interface for connecting the device 100 and the external apparatus (not shown) or a power source (not shown). Data stored in the storage unit 175 of the device 100 may be transmitted to the external apparatus (not shown) or data may be received from the external apparatus (not shown) over a wired cable connected to the connector 165 according to the control of the control unit 110. Power is input from the power source (not shown) or a battery (not shown) may be charged over wired cable connected to the connector 165.

The key pad 166 may receive a key input from a user to control the device 100. The key pad 166 includes a physical key pad (not shown) formed in the device 100 or a virtual key pad (not shown) displayed on the touch screen 190. The physical key pad (not shown) formed in the device 100 may be excluded according to a performance or structure of the device 100.

The sensor module 170 includes at least one sensor that detects a state of the device 100. For example, the sensor module 170 may include a proximity sensor that detects whether the user approaches the device 100, an illumination sensor (not shown) that detects an amount of light in the vicinity of the device 100, or a motion sensor (not shown) that detects an operation (for example, a rotation of the device 100, an acceleration or vibration applied to the device 100) of the device 100. The at least one sensor may detect the state of the device 100, generate a signal corresponding to the detected state, and transmit the signal to the control unit 110. The sensor of the sensor module 170 may be added or deleted according to the performance of the device 100.

The storage unit 175 may store an input and output signal or data in correspondence with operations of the mobile communication module 120, the sub communication module 130, the multimedia module 140, the camera module 150, the GPS module 155, the input and output module 160, the sensor module 170, and the touch screen 190 according to the control of the control unit 110. The storage unit 175 may store a control program or an application for controlling the device 100 or the control unit 110.

Although the storage unit 175 is separated from the ROM 112 and the RAM 113 in FIG. 10, the present invention is not limited thereto, the storage unit 175 may include the ROM 112 and the RAM 113. Although the storage unit 175 is disposed outside the control unit 110, the present invention is not limited thereto, and the storage unit 175 may be disposed in the control unit 110.

The term "storage unit" may include the ROM 112 and the RAM 113 of the control unit 110 or a memory card (not shown) (for example, a Secure Digital (SD) card and a memory stick) installed in the device 100. The "storage unit" may include non-volatile memory, volatile memory, a Hard Disk Drive (HDD), or a Solid State Drive (SSD).

The storage unit 175 may store at least one program. The control unit 110 may display execution windows of a plurality of applications by executing at least one program stored in the storage unit 175. The at least one program stored in the storage unit 175 may determine display modes of the plurality of applications by executing a multi window framework independently from an application framework for controlling and managing a single window. The at least one program stored in the storage unit 175 may display the execution windows of the applications on the touch screen according to the determined display modes by using the multi window framework.

The multi window framework may include a multi window manager that manages operations of the execution windows and provide Application Programming Interfaces (APIs) regarding the operation of the execution windows to the application framework. The multi window framework may include the APIs regarding the operation of the execution windows. The APIs may be distinguished according to display modes. The APIs may be provided to a framework that manages an operation of the single window from the multi window framework.

The power supply unit 180 may supply power to a single battery or a plurality of batteries (not shown) disposed in the housing of the device 100 according to the control of the control unit 110. The single battery supplies or the plurality of batteries (not shown) supply power to the device 100. The power supply unit 180 may supply power input from an external power source (not shown) to the device 100 over the wired cable connected to the connector 165.

The touch screen 190 may provide a user interface corresponding to diverse services (for example, a call, a data transmission, broadcasting, and image capturing) to the user. The touch screen 190 may transmit an analog signal corresponding to at least one touch input to the user interface to the touch screen controller 195. The touch screen 190 may receive an input of at least one touch through a user's body (for example, a finger including a thumb) or a touchable input unit (for example, a stylus pen). The touch screen 190 may receive an input of a continuous motion of a single touch from among the at least one touch. The touch screen 190 may transmit an analog signal corresponding to the continuous motion of the input touch to the touch screen controller 195.

The touch in the present disclosure is not limited to a contact between the touch screen 190 and the user's body or the touchable input unit and may include a non-contact (for example, a detectable interval between the touch screen 190 and the user's body or the touchable input unit may be equal to or smaller than 1 mm) The detectable interval of the touch screen 190 may be changed according to the performance or structure of the device 100.

The touch screen 190 may be implemented in, for example, a resistive type, a capacitive type, an infrared type, or an acoustic type.

The touch screen controller 195 converts the analog signal received from the touch screen 190 into a digital signal (for example, X and Y coordinates) and transmits the digital signal to the control unit 110. The control unit 110 may control the touch screen 190 by using the digital signal received from the touch screen controller 195. For example, the control unit 110 may select or execute a shortcut icon (not shown) displayed on the touch screen 190 in response to the touch. The touch screen controller 195 may be included in the control unit 110.

Figure 12:
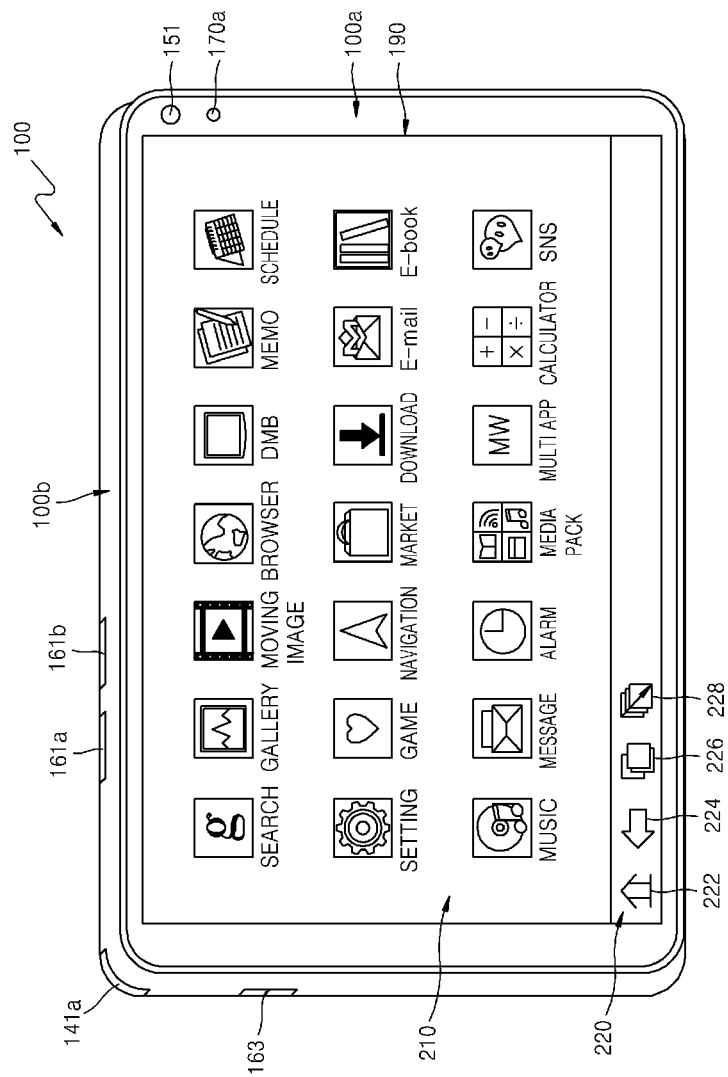
FIG. 12 is a perspective view of the device of FIG. 11 according to an exemplary embodiment of the present invention.

FIG. 12 is a perspective view of the device 100 according to an exemplary embodiment of the present invention.

Referring to FIG. 12, the touch screen 190 is disposed in the center of a front surface 100a of the device 100. The touch screen 190 is formed to be large so as to occupy a major portion of the front surface 100a of the device 100. The first camera 151 and an illumination sensor 170a may be disposed at the edge of the front surface 100a of the device 100. For example, a power and reset button 161a, a volume button 161b, the speaker 163, a terrestrial Digital Multimedia Broadcasting (DMB) antenna 141a for reception of broadcasting, a microphone (not shown), a connector (not shown), etc. may be disposed in a side surface 100b of the device 100, and a second camera (not shown) may be disposed in the rear (not shown) of the device 100.

The touch screen 190 includes a main screen 210 and a lower bar 220. In FIG. 12, a length of each of the device 100 and the touch screen 190 in a horizontal direction is greater than that thereof in a vertical direction. In this case, the touch screen 190 may be defined to be disposed in the horizontal direction.

The main screen 210 is a region in which a single application is executed or a plurality of applications is executed. FIG. 12 shows an example in which a home screen is displayed on the touch screen 190. The home screen is a first screen displayed on the touch screen 190 when the device 100 is powered on. Execution keys for executing a plurality of applications stored in the device 100 are displayed in rows and columns on the home screen. The execution keys may be formed in icons, buttons, or text. If each of the execution keys is touched, an application corresponding to the touched execution key is executed and displayed on the main screen 210.

The lower bar 220 is lengthwise elongated from a lower end of the touch screen 190 in the horizontal direction, and includes standard function buttons 222 through 228. A home screen movement button 222 displays the home screen on the main screen 210. For example, if the home screen movement button 222 is touched during the execution of applications on the main screen 210, the home screen of FIG. 12 is displayed on the main screen 210. A back button 224 displays a screen that was executed right before a currently executed screen or terminates the most recently used application. A multi view mode button 226 displays applications in a multi view mode according to the present disclosure on the main screen 210. A mode switch button 228 switches and displays a plurality of currently executed applications in different modes on the main screen 210. For example, if the mode switch button 228 is touched, a switch is made between a free style mode, in which the plurality of applications partially overlap each other in the device 100 and are displayed based on respective display priorities, and a split mode in which the plurality of applications are separated from each other in different regions and displayed on the main screen 210.

An upper bar (not shown) that indicates a status of the device 100 such as a battery charging status, intensity of a received signal, and a current time may be formed in the upper end of the touch screen 190.

Meanwhile, the lower bar 220 and the upper bar (not shown) may not be displayed on the touch screen 190 according to an Operating System (OS) of the device 100 or an application executed in the device 100. If both the lower bar 220 and the upper bar (not shown) are not displayed on the touch screen 190, the main screen 210 may be formed in the entire region of the touch screen 190. The lower bar 220 and the upper bar (not shown) may be displayed to translucently overlap each other on the main screen 210.

Meanwhile, applications may be programs independently implemented by a manufacturer of the device 100 or application developers. Accordingly, to execute one of applications, the other applications may not be executed in advance. Also, even if one of applications ends its execution, the other applications may continue their executions.

As described above, since applications are independently implemented programs, these applications are distinguished from a multifunctional application in which some functions (for example, a memo function and a message transmission and reception function) provided by other applications are added to one application (for example, a moving image application). However, the multifunctional application is a single application newly manufactured to have diverse functions and is different from given applications. Thus, the multifunctional application does not provide diverse functions like given applications and provides only limited functions, and furthermore, a user is burdened with an additional purchase of the multifunction application.

Figure 13:
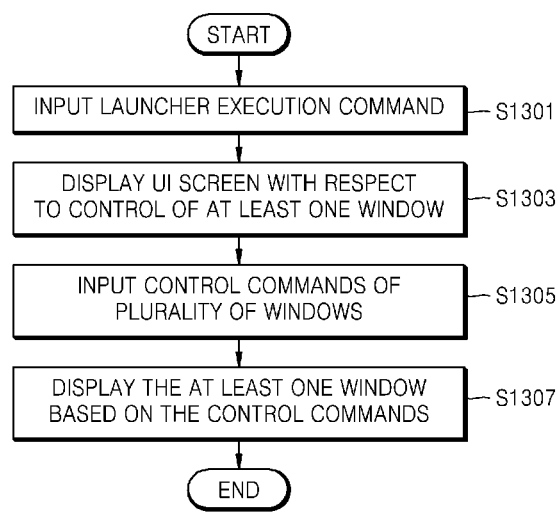
FIG. 13 is a flowchart of a method of executing a plurality of applications according to an exemplary embodiment of the present invention.

FIG. 13 is a flowchart of a method of executing a plurality of applications according to an exemplary embodiment of the present invention.

Referring to FIG. 13, the device 100 may receive an input of a command to execute a launcher relating to the plurality of applications, e.g., a launcher execution command, from a user in operation S1301. In this regard, the launcher relating to the plurality of applications may be a program to set and control a method of displaying execution windows of the plurality of applications. The user may execute the launcher and set how to display the execution windows of the plurality of applications on a screen of the device 100 by using the executed launcher.

If the launcher execution command is input, the device displays a user interface screen in response to the launcher execution command in operation S1303. The User Interface (UI) screen may be an execution screen of a launcher program. The user interface screen may be used to control at least one of an application used to execute the plurality of applications, how to display the plurality of applications, whether to display a title bar with respect to each of the plurality of applications, and a function of displaying a specific application screen on the highest end.

For example, the user interface screen may display a title of the application used to execute the plurality of applications, etc. Alternatively, the user interface screen includes a UI that may add or delete the application used to execute the plurality of applications. In this regard, the application used to execute the plurality of applications may be an application applied to a set predetermined environment.

Meanwhile, the user interface screen is used to select how to display the plurality of applications. How to display the plurality of applications refers to how to display the execution windows of the plurality of applications on the screen of the device 100 as the plurality of applications are executed. For example, the user may select one of a split mode, a free style mode, and a pin-up mode to display the execution windows of the plurality of applications in the selected mode by using the user interface screen. The split mode, the free style mode, and the pin-up mode will be described in detail further below.

Meanwhile, the user interface screen includes a UI for selecting whether to display the title bar with respect to each of the plurality of applications. The title bar may be a region that displays an identifier of an application executed in a window and a collection of application tools.

As described above, the user interface screen may be used to control at least one of the application used to execute the plurality of applications, how to display the plurality of applications, whether to display the title bar with respect to each of the plurality of applications, and the function of displaying the specific application screen on the highest end. Accordingly, the user may set a display configuration of the plurality of applications in a manner that the user wishes. For example, the user may integrate and manage an execution configuration of the plurality of applications by executing and manipulating the above-described launcher. For example, the display configuration of a window in which applications are executed may be integrated and managed by the launcher.

The device may receive a setting of the display configuration of the plurality of applications from the user through the user interface screen and receive an input of at least one window control command in operation S1305. For example, the window control command may include a command to designate applications A, B, C, D, and E as applications used to execute the plurality of applications, display the plurality of applications in the split mode and display the title bar with respect to each of the plurality of applications.

The device may display at least one window based on the received control command in operation S1307. For example, in a case where the user executes the applications A and B, the device may display the applications A and B in the split mode. In addition, the device may display title bars of the applications A and B together. Meanwhile, the user may designate and execute icons of the applications A and B, concurrently execute the applications A and B, or select and execute a previously determined application set concurrently. It will be understood by those of ordinary skill in the art that there is no limitation as to how to display the plurality of applications.

As described above, the user may easily control a display of execution results of the plurality of applications in a manner that the user wishes.

Figure 14:
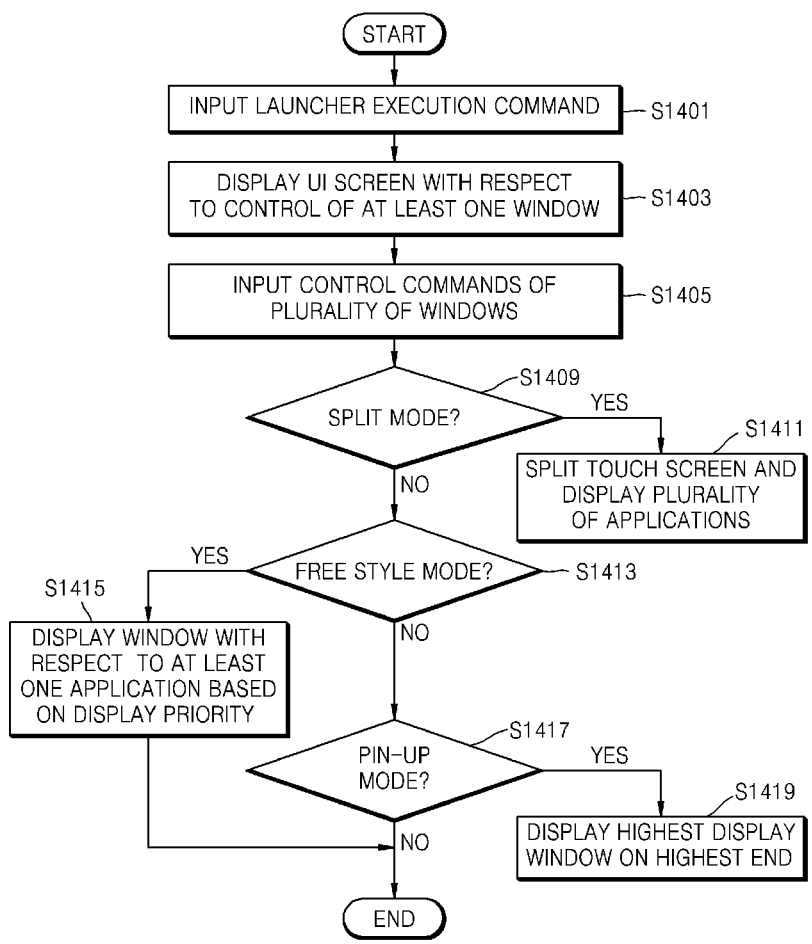
FIG. 14 is a flowchart of a method of executing a plurality of applications according to an exemplary embodiment of the present invention.

FIG. 14 is a flowchart of a method of executing a plurality of applications according to an exemplary embodiment of the present invention.

Referring to FIG. 14, a device may receive an input of a command to execute a launcher relating to the plurality of applications, e.g., a launcher execution command, from a user in operation S1401. If the launcher execution command is input, the device displays a user interface screen in response to the launcher execution command in operation S1403.

Meanwhile, a touch screen of the device may receive an input of control commands of a plurality of windows in operation S1405.

A control unit of the device may analyze the control commands of the plurality of windows. The control unit may determine whether the control commands of the plurality of windows indicate a display of at least one window in a split mode in operation S1409. As a result of the analysis, in the case where the control commands of the plurality of windows indicate the display of at least one window in the split mode, the control unit may control the touch screen to split and display the plurality of applications in operation S1411. The control unit may control the touch screen to split according to a previously set split ratio and display each of the applications on each of the split regions. The operation of the control unit that splits the touch screen according to the previously set split ratio and displays the plurality of applications will be described in more detail further below.

Meanwhile, the control unit may determine whether the control commands of the plurality of windows indicate a display of at least one window in a free style mode in operation S1413. As a result of the analysis, in the case where the control commands of the plurality of windows indicate the display of at least one window in the free style mode, the control unit may control a window with respect to at least one application to be displayed based on a display priority in operation S1415. In the case of the free style mode, the control unit may control the at least one application to be displayed to overlap each other. The operation of the control unit that displays the at least one application based on the display priority will be described in more detail further below.

Meanwhile, the control unit may determine whether the control commands of the plurality of windows indicate a display of at least one window in a pin-up mode in operation S1417. As a result of the analysis, in the case where the control commands of the plurality of windows indicate the display of at least one window in the pin-up mode, the control unit may control the at least one application to be displayed based on a display priority and display a specific window on the highest end in operation S1419. In the case of the pin-up mode, the control unit may control the at least one application to be displayed to overlap each other. Meanwhile, the control unit changes a display priority of the specific window designated to be displayed on the highest end to the highest priority. The control unit may control the specific window to be displayed on a higher end than other windows. The operation of the control unit that displays the specific window on the highest end will be described in more detail later.

Figure 15A:
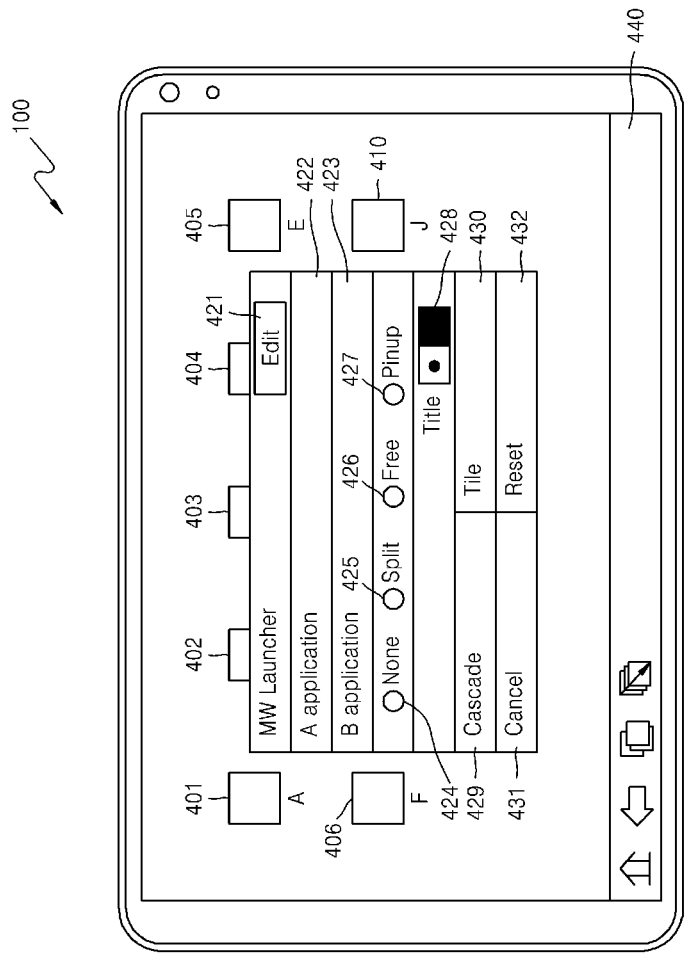
FIG. 15A shows an example of a user interface screen corresponding to a launcher execution command according to an exemplary embodiment of the present invention.

FIG. 15A shows an example of a user interface screen corresponding to a launcher execution command according to an exemplary embodiment of the present invention. That is, FIG. 15A shows an example of an execution screen of a launcher program.

Application icons 401 through 410 and a lower bar 440 are displayed on a touch screen. If a launcher execution command is input, a control unit displays the user interface screen on an arbitrary region of the touch screen at an arbitrary size. The control unit may display the user interface screen to cover the application icons 401 through 410.

The user interface screen displays applications A 422 and B 423 used to execute a plurality of applications. In FIG. 15A, the user interface screen may display the applications A 422 and B 423 as applications used to execute the plurality of applications. Meanwhile, the user interface screen may further display a function key 421 for editing the applications used to execute the plurality of applications. A user may designate the function key 421 and add or delete the applications used to execute the plurality of applications.

The user interface screen displays a selection key 424 used not to perform a display of the plurality of applications, a split mode section key 425, a free style mode selection key 426, and a pin-up mode selection key 427. The user may select one of the selection keys 424 through 427. A control unit may analyze a selection key designated by the user and determine a display mode of the plurality of applications. For example, if the user designates the free style mode selection key 426, the control unit may control the plurality of applications to be displayed in the free style mode.

Meanwhile, the user interface screen may display a title bar selection key 428 used to select whether to display a title bar. The user touches and drags the title bar selection key 428 in a left or right direction so that the title bar may be selected to be displayed or to not be displayed. The control unit may adjust a location of the title bar selection key 428 according to a direction selected by the user. For example, if the user touches and drags the title bar selection key 428 in the left direction, the control unit controls the title bar selection key 428 to be displayed to the left. Also, if the user touches and drags the title bar selection key 428 in the right direction, the control unit controls the title bar selection key 428 to be displayed to the right. In a case where the title bar selection key 428 is displayed to the left, the control unit may control the title bar to be displayed. In a case where the title bar selection key 428 is displayed to the right, the control unit may control the title bar to not be displayed.

Meanwhile, the user interface screen may further display a cascade function key 429, a tile function key 430, a cancel function key 431, and a reset function key 432.

The cascade function key 429 is a function key to align the displayed plurality of applications to overlap each other at previously set sizes. For example, if a cascade function is performed in a free style mode, windows having different sizes and displayed at different locations may be aligned to overlap each other while having the same size.

The tile function key 430 is a function key to align the displayed plurality of applications not to overlap each other at previously set sizes. For example, if a tile function is performed in the free style mode, windows having different sizes and displayed at different locations may be aligned not to overlap each other while having the same size. For example, in a case where four applications are executed, windows in which the four applications are executed are set to ¼ a screen size and aligned in tile shapes.

The cancel function key 431 is a function key to cancel a correction with respect to a set value of a launcher.

The reset function key 432 is a function key to reset all set values controlled by the launcher to initial designated values.

Figure 15B:
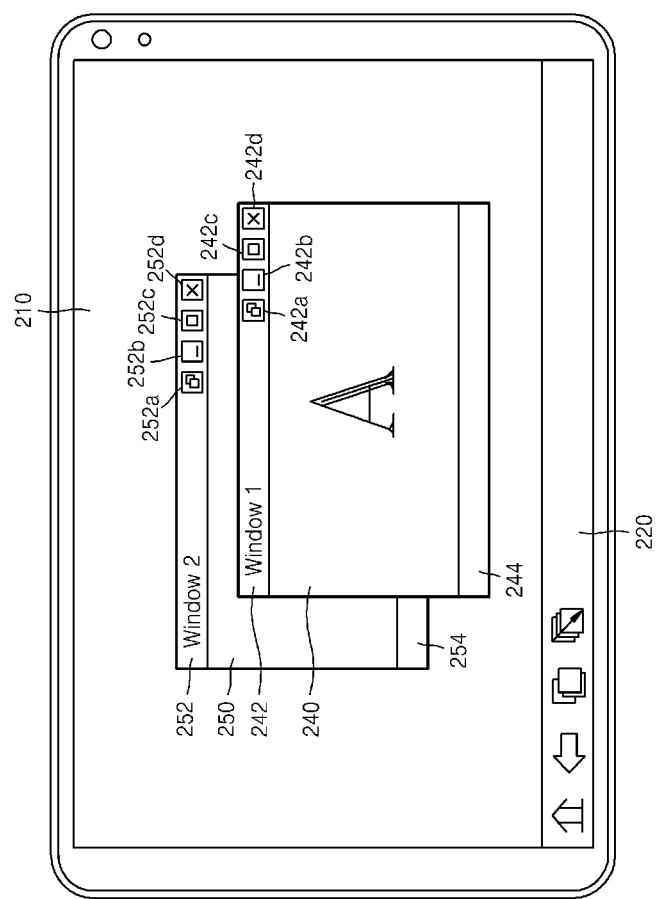
FIG. 15B shows an example in which two applications are displayed on a main screen in a free style mode according to an exemplary embodiment of the present invention.

FIG. 15B shows an example in which two applications and lower bar 220 are displayed on the main screen 210 in a free style mode according to an exemplary embodiment of the present invention. The first application is executed in and displayed on a first window 240. The second application is executed in and displayed on a second window 250. The second window 250 is displayed on a lower layer of the first window 240 in the free style mode. For example, as shown in FIG. 15B, the second window 250 may be displayed at a right upper end of the first window 240 at a lower layer than the first window 240. In this regard, the first application and the second application have respective display priorities. In the present exemplary embodiment, the first application is assumed to have a higher display priority than the second application. A control unit controls the first application to be displayed at a higher layer than the second application according to the display priorities. For example, in a case where a region on which the first application is displayed and a region on which the second application is displayed overlap each other, the control unit controls the first application to be displayed and an overlapping part of the second application to not be displayed.

The first window 240 is substantially rectangular having upper, lower, left, and right corners in which the first application is executed. A title bar 242 may be formed on an upper end of the first window 240 and a job display bar 244 may be formed on a lower end thereof. A title (for example, a web browser) of the first application executed in the first window 240 is displayed on the title bar 242. A basic size button 242a with respect to a size of the first window 240, a minimum button 242b, a maximum button 242c, and a button 242d for terminating the first window 240 may be sequentially formed in the title bar 242. The job display bar 244 may display an execution state of the first application. However, the title bar 242 and the job display bar 244 may be omitted according to control commands of a plurality of windows.

The second window 250 is substantially rectangular having upper, lower, left, and right corners in which the second application is executed. A title bar 252 may be formed on an upper end of the second window 250 and a job display bar 254 may be formed on a lower end thereof. A title (for example, a web browser) of the second application executed in the second window 250 is displayed on the title bar 252. A basic size button 252a with respect to a size of the second window 250, a minimum button 252b, a maximum button 252c, and a button 252d for terminating the second window 250 may be sequentially formed in the title bar 252. The job display bar 254 may display an execution state of the second application. However, the title bar 252 and the job display bar 254 may be omitted.

A plurality of objects relating to the first and second applications and are displayed on the first and second windows 240 and 250. The objects may include text, diagrams, icons, buttons, check boxes, photos, moving images, web page, maps, etc. In a case where the user touches the objects, a function or event previously determined in the objects may be performed in a corresponding application. The objects may be referred to as views according to an operating system.

Figure 15C:
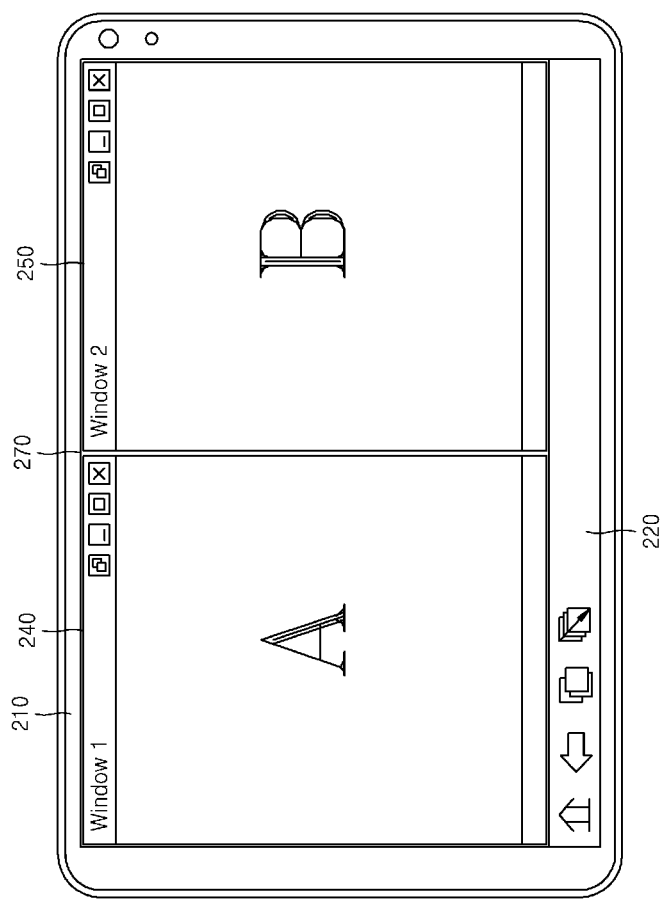
FIG. 15C shows an example in which two applications are displayed on a main screen in a split mode according to an exemplary embodiment of the present invention.

FIG. 15C shows an example in which the two applications and lower bar 220 are displayed on the main screen 210 in a split mode. If a user selects the split mode, the control unit 110 may concurrently execute the applications and display the applications on the main screen 210 in the split mode.

In the split mode, the first window 240 and the second window 250 may be displayed not to overlap each other on the main screen 210. For example, as shown in FIG. 15C, in a case where the main screen 210 is divided into two parts, the first window 240 may be displayed on the left half of the main screen 210 and the second window 250 may be displayed on the right half thereof. The first window 240 and the second window 250 may be aligned to be adjacent to each other and share a common boundary line 270 but do not overlap each other. The common boundary line 270 is disposed between the first window 240 and the second window 250.

As described above, a device may display a plurality of applications in a free style mode or split mode based on received control commands of a plurality of windows. Meanwhile, a pin-up mode will be described in more detail further below.

Figure 16A:
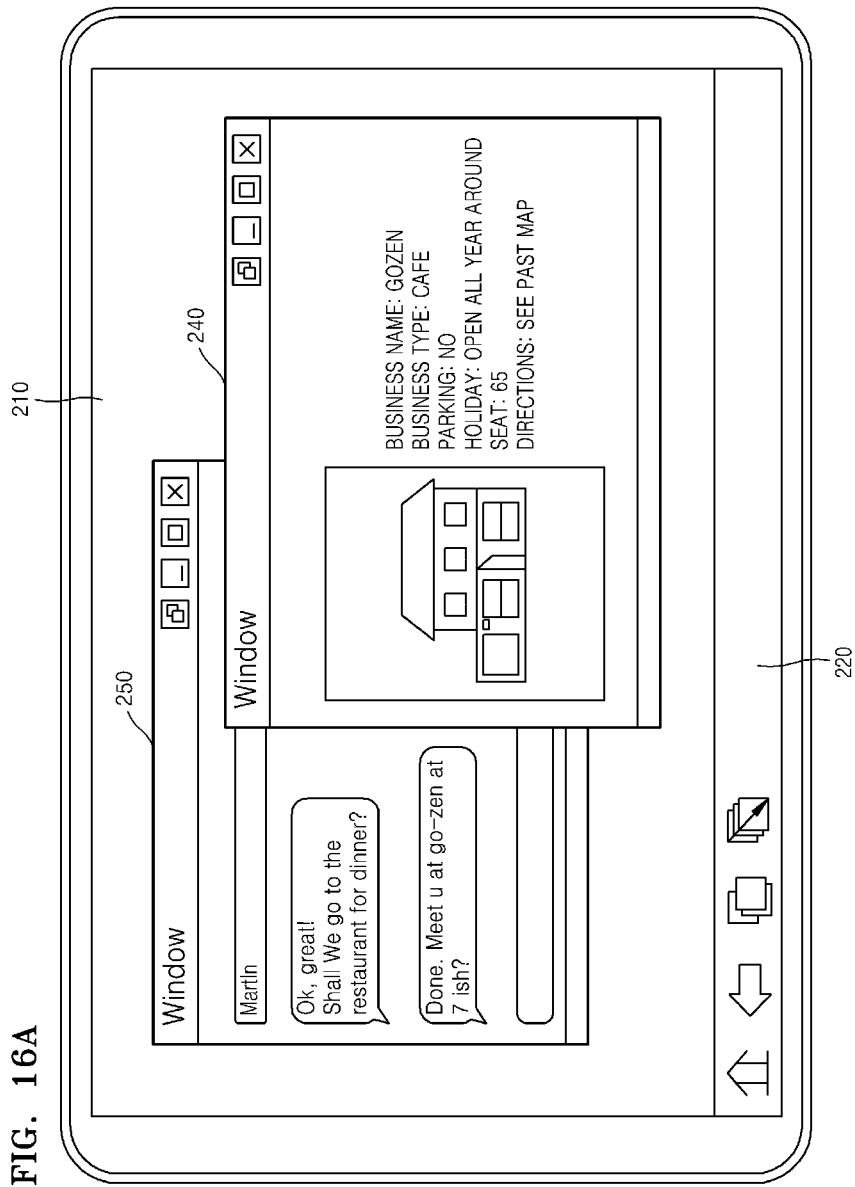
FIGS. 16A and 16B show screens on which a plurality of applications are executed according to exemplary embodiments of the present invention.
Figure 16B:
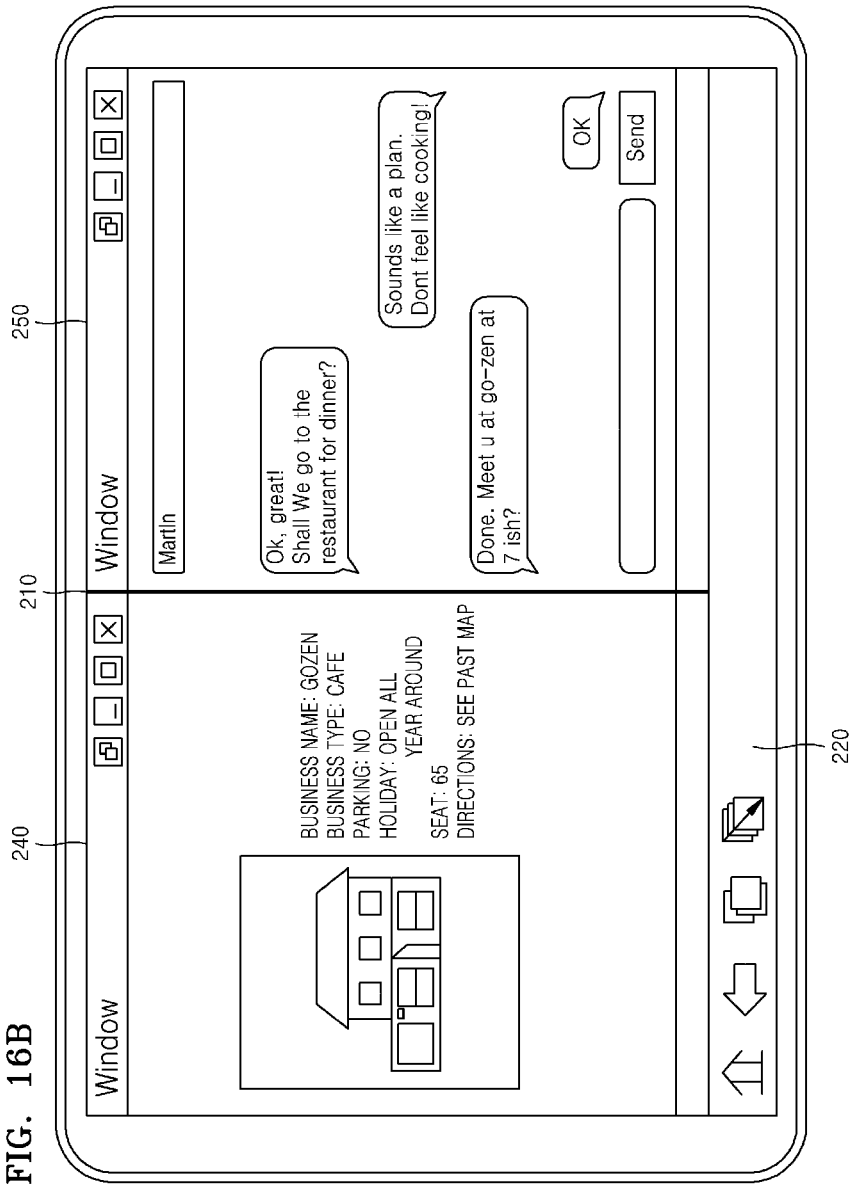

FIGS. 16A and 16B show screens on which a plurality of applications is executed according to exemplary embodiments of the present invention.

FIG. 16A shows an example in which the plurality of applications are executed in an overlap mode on the main screen 210 in which a web browser application is executed in the first window 240 and a message application is executed in the second window 250. A lower bar 220 may also be shown. FIG. 16B shows an example in which the first window 240 and the second window 250 are displayed in a split mode on the main screen 210. A lower bar 220 may also be shown.

Referring to FIGS. 16A and 16B, a user may search for a desired restaurant through the web browser application executed in the first window 240 on the touch screen 190 according to the present disclosure and concurrently make a dinner appointment with a friend at the desired restaurant through the message application executed in the second window 250. As shown in FIGS. 16A and 16B, the user may search for information from the Internet by touching objects on the first window 240. The user may talk with a friend Martin through a message service by touching objects on the second window 250.

Figure 16C:
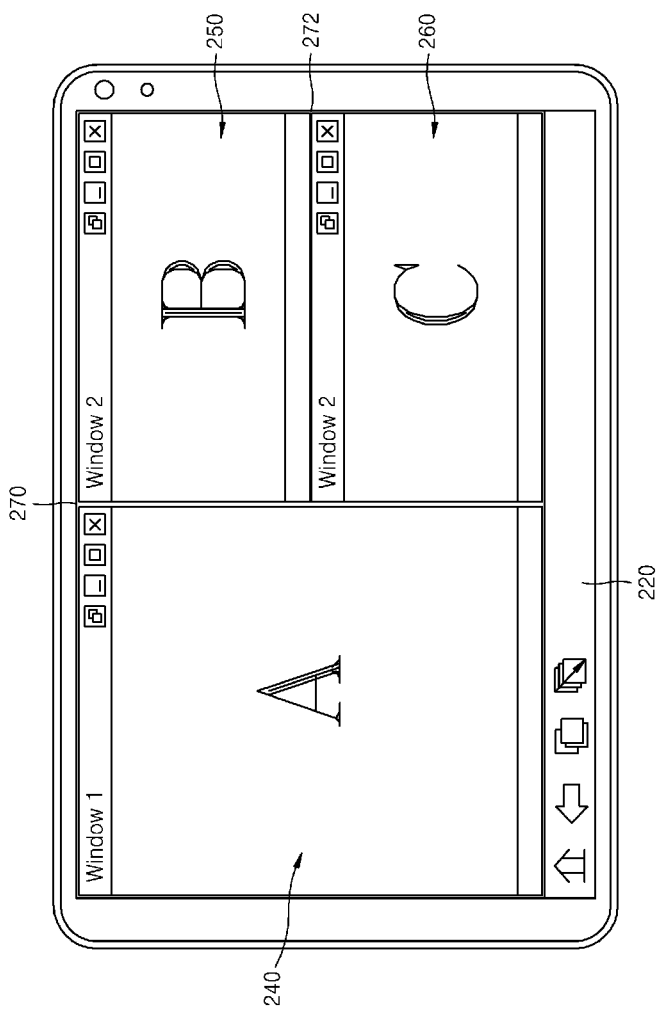
FIGS. 16C to 16E show examples in which three applications are displayed on a main screen in a split mode according to an exemplary embodiment of the present invention.
Figure 16D:
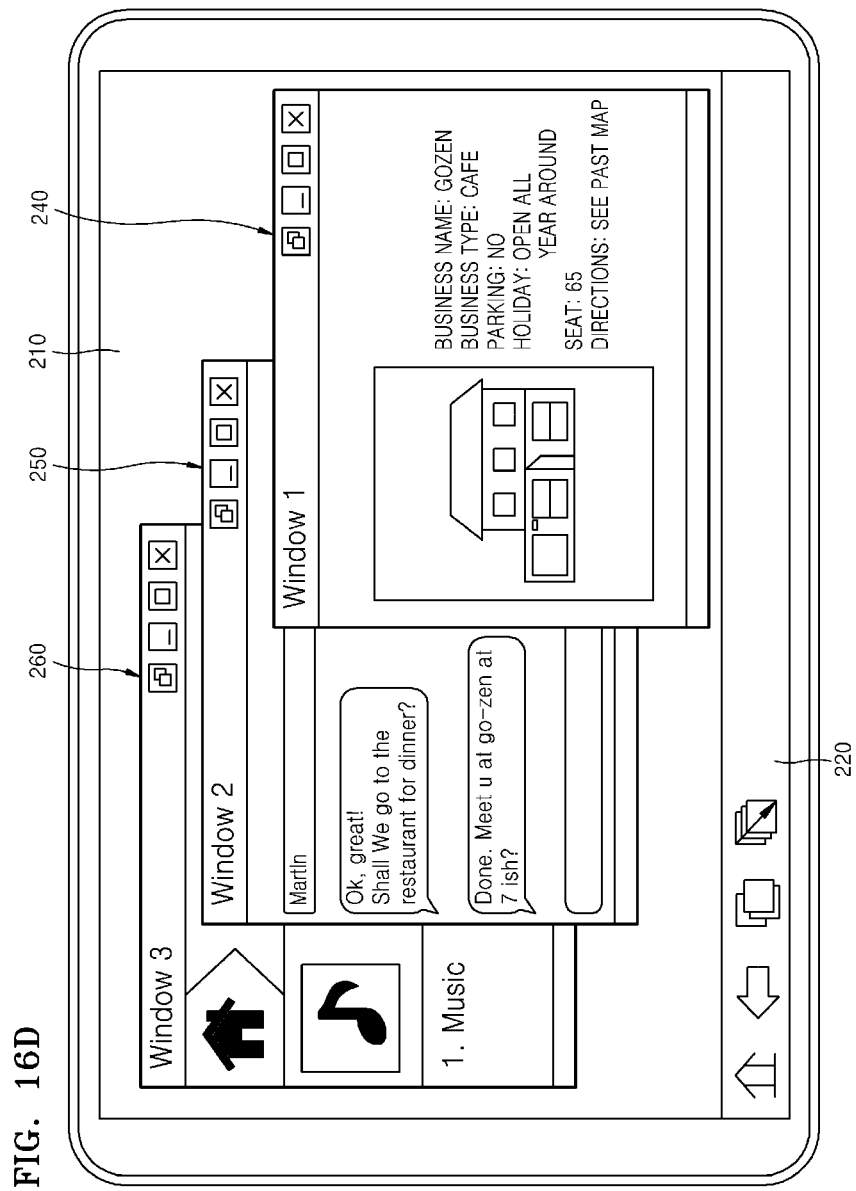
Figure 16E:
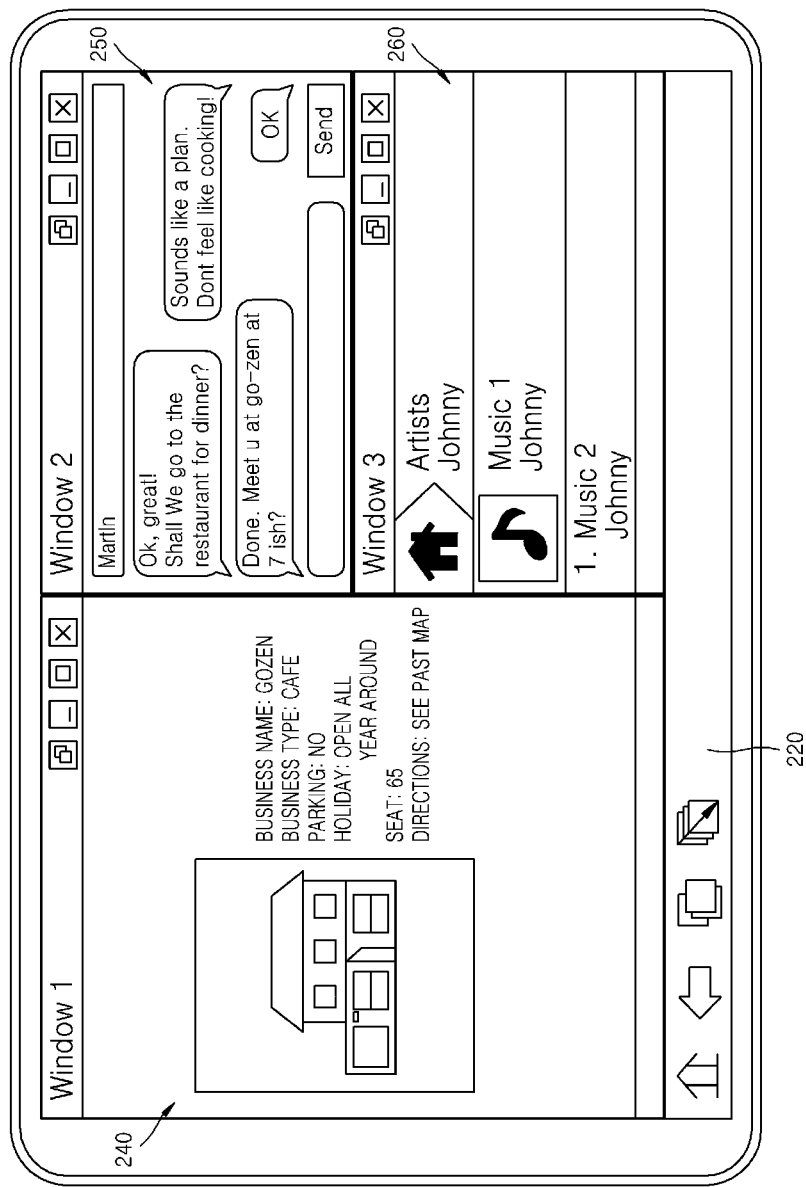

FIGS. 16C to 16E show examples in which three applications are displayed on a main screen in a split mode according to an exemplary embodiment of the present invention.

FIGS. 16C to 16E show an example in which windows for three applications are displayed on the main screen 210 in a split mode. A lower bar 220 may also be shown. The control unit 110 may concurrently execute the three applications and display windows for the applications on the main screen 210 in the split mode.

In the split mode, the first window 240, the second window 250, and a third window 260 may be displayed not to overlap each other on the main screen 210. For example, as shown in FIG. 16C, in a case where the main screen 210 is divided into three parts, the first window 240 may be displayed on the left half of the main screen 210, the second window 250 may be displayed on the right upper portion thereof, and the third window 260 may be displayed on the right lower portion thereof. The first window 240, the second window 250, and the third window 260 may share the common boundary line 270 and be aligned so as not to overlap each other. The second window 250 and the third window 260 may share a common boundary line 272 and be aligned so as not to overlap each other.

FIGS. 17A to 17G are conceptual diagrams for explaining a free style mode in more detail according to an exemplary embodiment of the present invention.

Figure 17A:
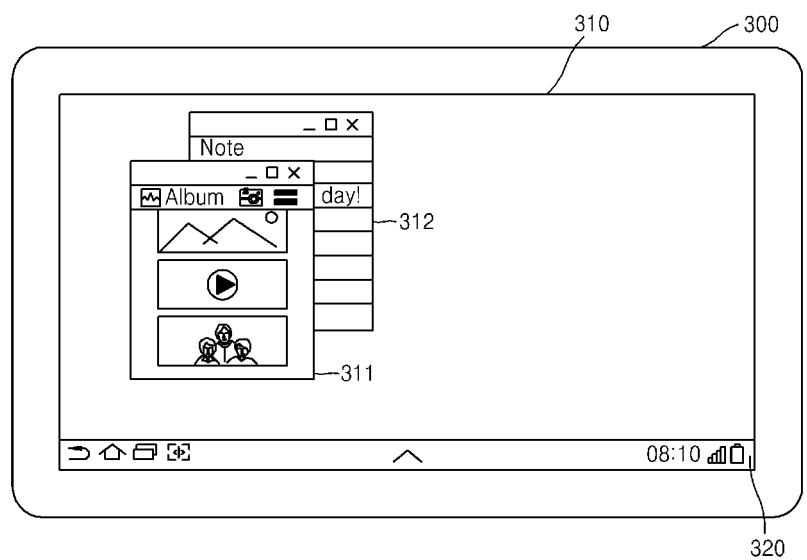
FIGS. 17A to 17G are conceptual diagrams for explaining a free style mode in more detail according to an exemplary embodiment of the present invention.

FIG. 17A shows a window display screen according to an exemplary embodiment of the present invention.

Referring to FIG. 17A, a display device 300 includes a touch screen 310. A plurality of windows 311 and 312 are displayed on the touch screen 310. In addition, a lower bar 320 is displayed on a lower end of the touch screen 310.

A window may be a region including an execution screen of a specific application, a title bar with respect to an executed application, and a control region. Objects relating to the application may be displayed on the execution screen of the application. The objects may include diverse shapes such as text, diagrams, icons, buttons, check boxes, photos, moving images, web pages, maps, etc. In a case where a user touches the objects, a function or event previously determined in the objects may be performed in a corresponding application. The objects may be referred to as views according to an operating system. The title bar may be a region that displays an identifier of an application executed in the window and a collection of application tools. In addition, the control region may be a region that controls a display and end of the window. For example, the control region may include a window display minimum button, a window display maximum button, and a window end button.

Meanwhile, the control unit 110 may control the plurality of windows 311 and 312 to be displayed to partially overlap each other. The control unit 110 may set a display priority with respect to each of the windows 311 and 312. For example, the control unit 110 may set a first display priority with respect to the window 311 and a second display priority with respect to the window 312. Accordingly, the control unit 110 displays the window 311 having a relatively higher display priority to cover the window 312. A part of the window 312 having a relatively lower display priority that overlaps the window 311 having the relatively higher display priority is not displayed.

The control unit 110 may set a highest display priority with respect to a window in which a control event is most recently input. For example, if the user touches the window 311, the control unit 110 sets the highest display priority with respect to the window 311.

Figure 17B:
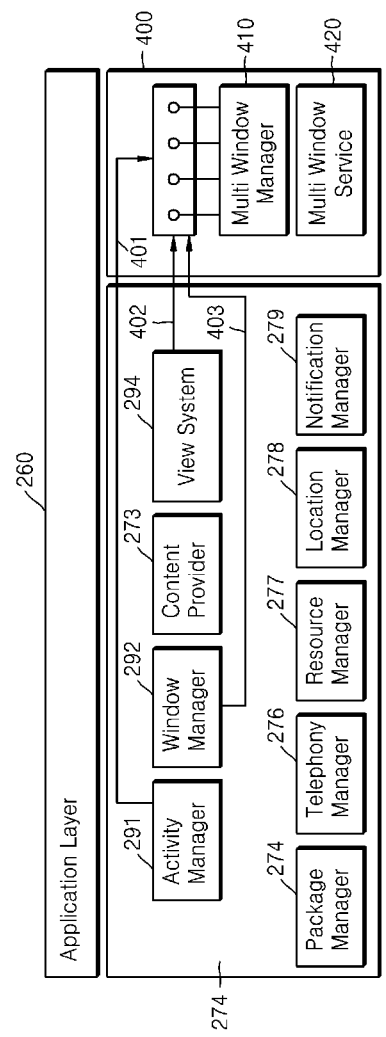

FIG. 17B is a conceptual diagram for explaining a framework 274 according to an exemplary embodiment of the present invention.

Referring to FIG. 17B, an activity manager 291, a window manager 292, and a view system 294 of the framework 274 may be compatible with a multi window framework 400 via control 401, 403, and 402, respectively. The framework 274 may be used to control and manage a single window in a case where the single window is displayed on the device 100. The framework 274 may further include a content provider 273, a package manager 274, a telephony manager 276, a resource manager 277, a location manager 278, and a notification manager 279. Also, the multi window framework 400 may be used to display and control a plurality of windows according to a predetermined display mode in a case where the plurality of windows are displayed on the device 100.

The multi window framework 400 includes a multi window manager 410 and a multi window service 420.

The activity manager 291, the window manager 292, and the view system 294 may perform a function of calling an API for a multi window.

The multi window manager 410 may provide a function of the multi window service 420 in an API form to a user.

A manager and service structure may operate based on an Inter-Process Communication (IPC).

The multi window service 420 tracks an execution life-cycle of applications executed on the multi window and integrates and manages a status such as a size and location of each application.

The called API may manage the size, location, and visibility of each application.

As described above, the framework according to the present disclosure may operate by providing an independent multi window framework and calling the API.

In addition, an application layer 260 may directly call the API from the multi window manager 410. For example, the user may receive and use the API from the multi window manager 410 in a case where a new application is developed.

As described above, the multi window framework 400 may be selected and two or more applications may be concurrently displayed.

A launcher program may be included in the application layer 260, connected to the multi window framework 400, and set diverse maters regarding a display of the execution windows of the plurality of applications.

Figure 17C:
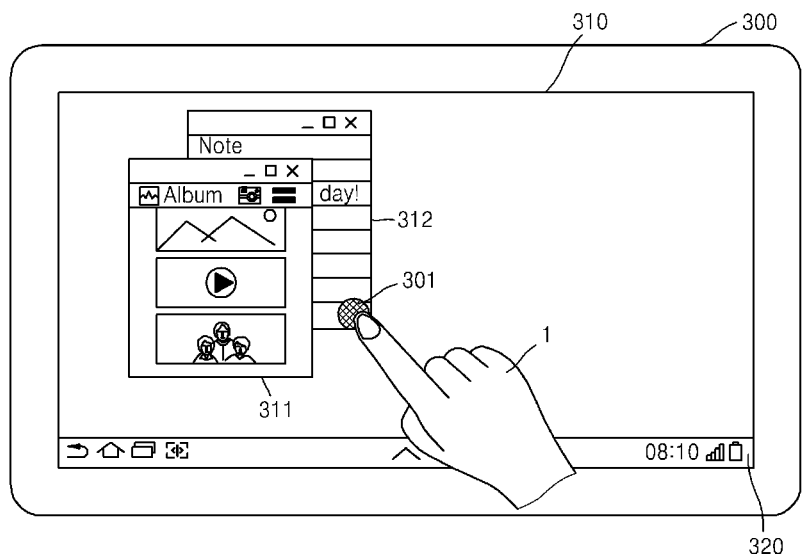

FIG. 17C shows a screen for explaining a change in a display priority according to an exemplary embodiment of the present invention.

Referring to FIG. 17C, a plurality of windows 311 and 312 are displayed on the touch screen 310 of display device 300. In addition, a lower bar 320 is displayed on a lower end of the touch screen 310. Here, a user 1 touches 301 the window 312. The control unit 110 sets a highest display priority with respect to the window 312 in which a control event is most recently input. In addition, the control unit 110 sets a second highest display priority with respect to the window 311 having a given highest display priority. For example, the control unit 110 reduces and sets a display priority of the window 311 by a level 1.

Figure 17D:
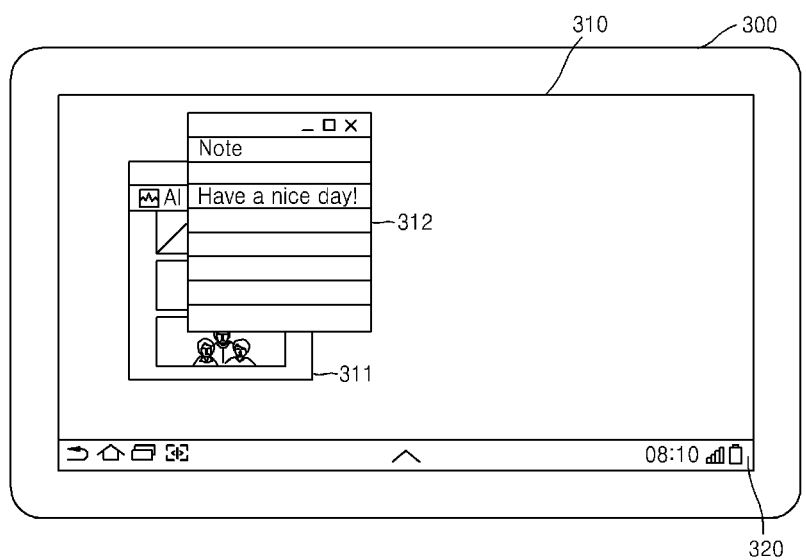

FIG. 17D shows a screen on which windows having changed display priorities are displayed according to an exemplary embodiment of the present invention.

Referring to FIG. 17D, a plurality of windows 311 and 312 are displayed on the touch screen 310 of display device 300. In addition, a lower bar 320 is displayed on a lower end of the touch screen 310. Here, the window 312 having the highest display priority may be displayed to cover the window 311. A part of the window 311 having a relatively lower display priority that overlaps the window 312 having a relatively higher display priority is not displayed.

Figure 17E:
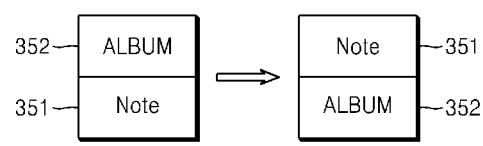

FIG. 17E is a conceptual diagram of a task stack according to an exemplary embodiment of the present invention. The task stack may set a high priority with respect to an application in which a control event is most recently input. For example, in the task stack on the left side of FIG. 17E, an album application 352 has a higher task priority than a note application 351. Meanwhile, in the task stack on the right side of FIG. 17E, the note application 351 has a higher task priority than the album application 352.

Figure 17F:
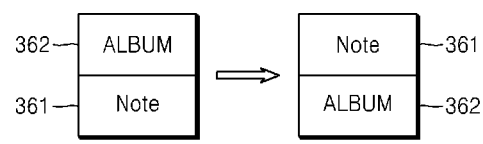

FIG. 17F is a conceptual diagram of a display stack according to an exemplary embodiment of the present invention. The display stack may set a high priority with respect to an application in which a control event is most recently input like a task stack. For example, in the task stack on the left side of FIG. 17F, the album application 362 has a higher task priority than the note application 361. Meanwhile, in the task stack on the right side of FIG. 17F, the note application 361 has a higher task priority than the album application 362.

For example, the control unit 110 may set the task stack and the display stack in the same manner.

Figure 17G:
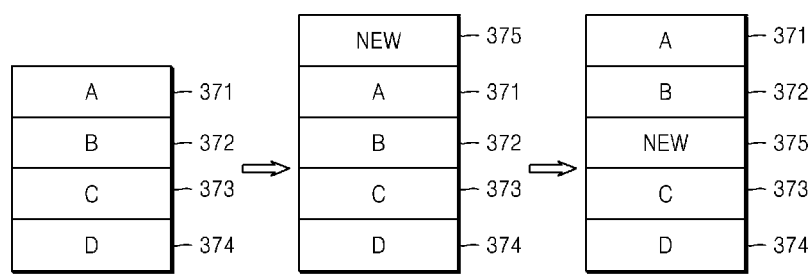

FIG. 17G is a conceptual diagram of a display stack when a new application is executed according to an exemplary embodiment of the present invention. In FIG. 17G, applications A through D 371 through 374 are assumed to be executed. Meanwhile, a user may input a highest display command with respect to the applications A 371 and B 372. Meanwhile, the user may newly execute an application New 375. The control unit 110 preferentially sets a highest display priority with respect to the application New 375. In addition, the control unit 110 may adjust a display priority of the application New 375 to a second highest priority of the applications A 371 and B 372 in which the highest display command is input. The control unit 110 adjusts the display priority of the application New 375 to be higher than applications 373 and 374. As described above, even if a new application selected last by the user is executed, the control unit 110 may control the applications A 371 and B 372 in which the highest display command is input to have the highest display priority. A highest location of a display stack may be a most recently executed application or a most recently selected application with the highest display.

FIGS. 18A to 18E show screens of a display device 500 for explaining a pin-up mode according to an exemplary embodiment of the present invention. In a case where control commands of a plurality of windows are in the pin-up mode, a control unit may control a specific window to be displayed higher than other windows.

Referring to FIGS. 18A to 18E, the display device 500 displays a first window 520, a second window 530, and a third window 540 on a touch screen 510. Meanwhile, a lower bar 550 may be displayed on a lower end of the touch screen 510.

Figure 18A:
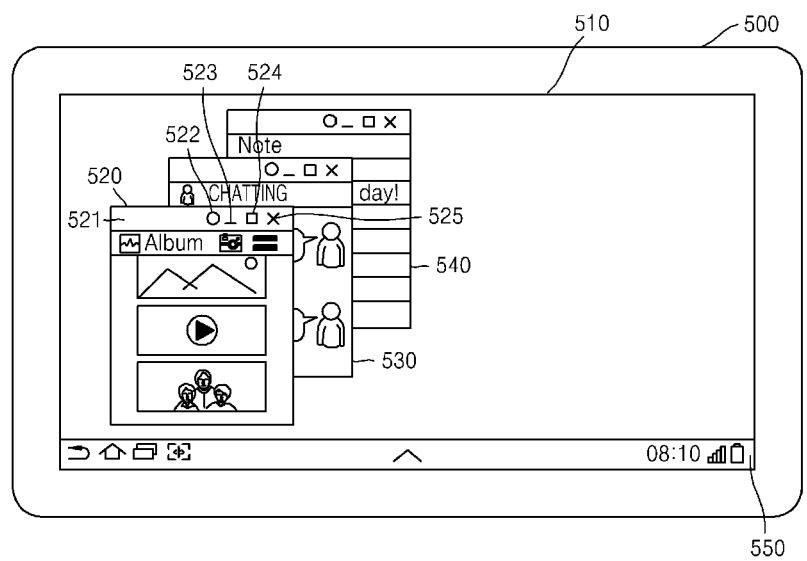
FIGS. 18A to 18E show screens of a display device for explaining a pin-up mode according to an exemplary embodiment of the present invention.

In FIG. 18A, the first window 520 includes a control region 521. The control region 521 includes a highest display command button 522, a minimum button 523, a maximum button 524, and an end button 525. A user may touch the highest display command button 522. The control unit 110 recognizes a highest display command to be input in a corresponding window. The control unit 110 sets and fixes a highest display priority with respect to the first window 520. Meanwhile, a second display priority may be set with respect to the second window 530, and a third display priority may be set with respect to the third window 540. If a highest display command is selected from the control commands of the plurality of windows, the control unit 110 may control the highest display command button 522 to be displayed.

Figure 18B:
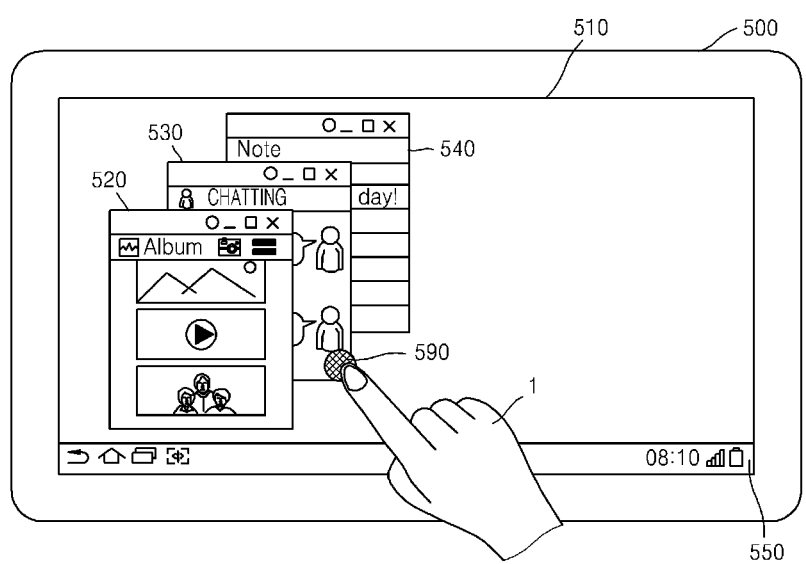

In FIG. 18B, the user 1 may input a control event of a touch 590 in the second window 530. The control unit 110 sets a first task priority with respect to the second window 530. The control unit 110 fixes a display priority of the first window 520 to a first display priority, and a display priority of the second window 530 to a second display priority. For example, the control unit 110 sets a second highest display priority with respect to the second window 530.

Figure 18C:
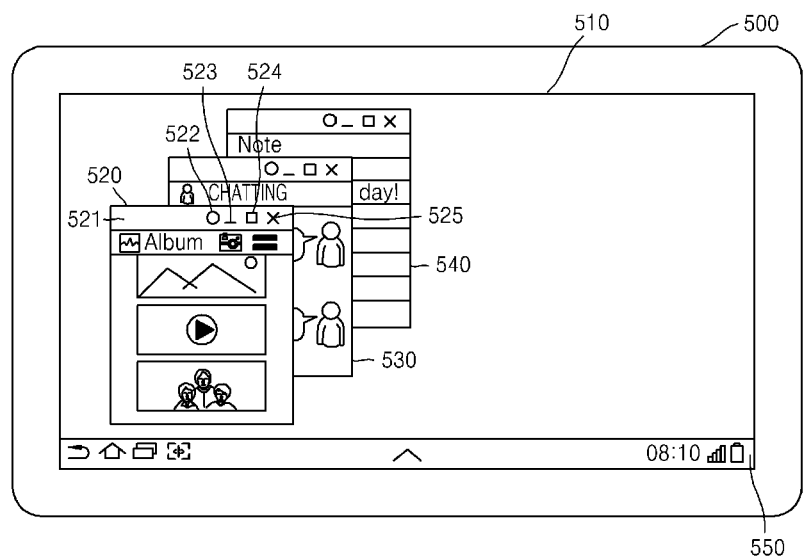

Accordingly, the control unit 110 displays the first window 520 to cover the second window 530 as shown in FIG. 18C. Meanwhile, an application to be executed in the second window 530 may be executed.

Figure 18D:
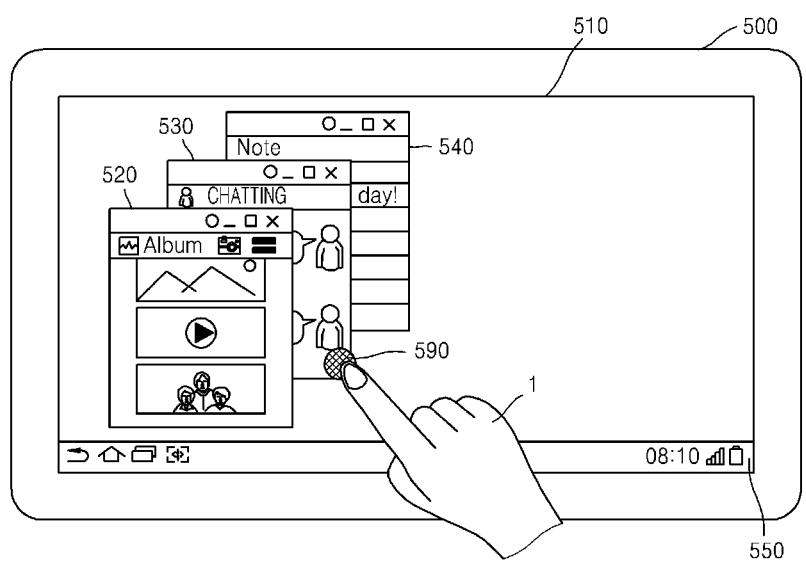

Referring FIG. 18D, the user 1 may input a control event of the touch 590 in the third window 540. The control unit 110 sets a first task priority with respect to the third window 540. The control unit 110 fixes the display priority of the second window 530 to a first display priority, and a display priority of the third window 540 to a second display priority. For example, the control unit 110 sets a second highest display priority with respect to the third window 540. In addition, the control unit 110 sets a third display priority with respect to the second window 530.

Figure 18E:
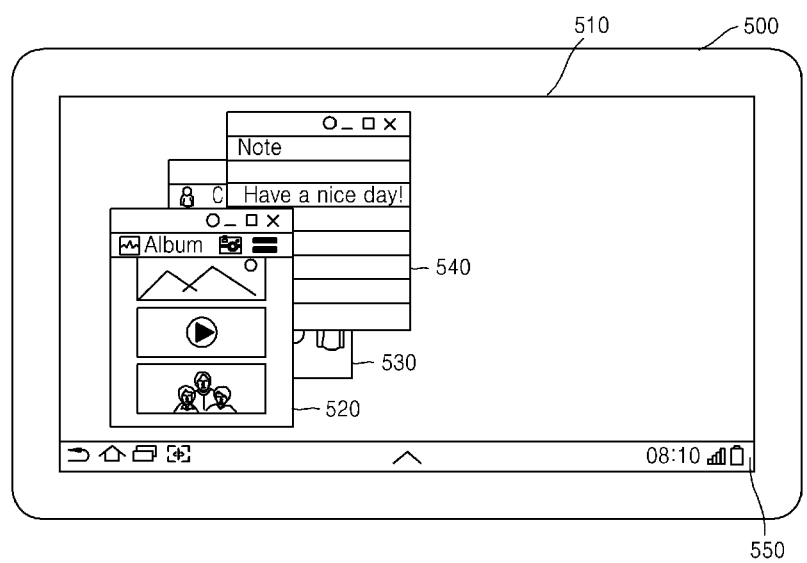

Accordingly, the control unit 110 displays the first window 520 to cover the second window 530 and the third window 540 as shown in FIG. 18E. Meanwhile, the control unit 110 displays the third window 540 to cover the second window 530. Meanwhile, an application to be executed in the third window 540 may be executed.

As described above, the control unit 110 may control a highest display window to be displayed higher than other windows. In addition, the user may set a user interface screen and easily set a display of a plurality of windows in a manner that the user wishes in a split mode, a free style mode, or a pin-up mode.

The one or more exemplary embodiments of the present invention may be written as computer programs in a non-transitory computer-readable recording medium, e.g., a program module to be executed in computers, which include computer-readable commands. The non-transitory computer-readable recording medium may include any usable medium that may be accessed by computers, volatile and non-volatile media, and detachable and non-detachable media. Also, the non-transitory computer-readable recording medium may include a computer storage medium and a communication medium. The computer storage medium includes all of volatile and non-volatile media, and detachable and non-detachable media which are designed to store information including computer readable commands, data structures, program modules or other data. The communication medium includes computer-readable commands, a data structure, a program module, and other transmission mechanisms, and includes other information transmission media.

The techniques described herein may, however, be embodied in many different forms and should not be construed as being limited to the exemplary embodiments set forth herein; rather, these exemplary embodiments are provided so that this disclosure will be thorough and complete, and will fully convey the inventive concept to those of ordinary skill in the art.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of displaying a plurality of display windows on a screen by using a device, the method comprising:
   displaying a first display window of a first application on the screen;
   receiving a first user input that selects an object included in the first display window of the first application;
   displaying, on the first display window, a list of applications matching a window display mode of the first display window in response to the first user input, the window display mode being for displaying a window of an application according to at least one of a size, a displaying position or a displaying priority of the window;
   receiving a second user input that selects a second application included in the list of applications;
   displaying a second display window of the second application selected from the list of applications in the window display mode of the first display window;

displaying the list of applications when a predetermined object included in the second display window is selected; and displaying a third display window, including the execution result of an application selected from the list of applications, the third display window being separate from the first display window, wherein the window display mode is set to an application, wherein each application of the list of applications renders a window having a window display mode that is same as the window display mode of the first display window, and wherein the second display window and third display window overlap each other.

2. The method of claim 1, wherein the displaying of the second display window comprises:

splitting a region of the screen of the device on which the first display window is displayed; and displaying the first display window and the second display window on the split regions.

3. The method of claim 2, wherein the first display window is displayed on an entire region of the screen of the device.

4. The method of claim 2, further comprising:

displaying the list of applications matching the window display mode when the predetermined object included in the second display window is selected;

splitting at least one of the first display window or the second display window when a predetermined application is selected from the list of applications; and displaying the third display window including an execution result of the selected application on the split regions.

5. The method of claim 1, wherein the displaying of the third display window comprises displaying the third display window in the window display mode.

6. The method of claim 1, wherein the third display window is displayed on an entire region of the screen of the device.

7. The method of claim 1, wherein the window display mode comprises at least one of a split mode, a free style mode or a pin-up mode, and wherein the window display mode corresponding to applications installed in the device is previously set.

8. A non-transitory computer-readable recording medium having recorded thereon a program for executing the method of claim 1.

9. A device comprising:

a touch screen configured to:
receive touch inputs, and
display windows; and at least one processor configured to:

control the touch screen to receive a first touch input that selects an object included in a first display window of a first application displayed on the touch screen, based on the first touch input, control the touch screen to display, on the first display window, a list of applications matching a window display mode of the first display window, the window display mode is for displaying a window of an application according to at least one of a size, a displaying position or a displaying priority of the window;

control the touch screen to receive a second touch input that selects a second application included in the list of applications, display a second display window of the second application selected from the list of applications in the window display mode of the first display window, display the list of applications when a predetermined object included in the second display window is selected, and display a third display window, including the execution result of an application selected from the list of applications, the third display window being separate from the first display window, wherein the window display mode is set to an application, wherein each application of the list of applications renders a window having a window display mode that is same as the window display mode of the first display window, and wherein the second display window and the third display window overlap each other.

10. The device of claim 9, wherein the at least one processor is further configured to:

split a region of the screen of the device on which the first display window is displayed, and display the first display window and the second display window on the split regions.

11. The device of claim 10, wherein the first display window is displayed on an entire region of the screen of the device.

12. The device of claim 10, wherein the at least one processor is further configured to:

display the list of applications when the predetermined object included in the second display window is selected, split at least one of the first display window or the second display window when a predetermined application is selected from the list of applications, and display a third display window including an execution result of the selected application on the split regions.

13. The device of claim 9, wherein the at least one processor is further configured to display the third display window in the window display mode.

14. The device of claim 9, wherein the third display window is displayed on an entire region of the screen of the device.

15. The device of claim 9, wherein the window display mode comprises at least one of a split mode, a free style mode or a pin-up mode, and wherein the window display mode corresponding to applications installed in the device is previously set.

* * * * *